(12) United States Patent
Meyer et al.

(10) Patent No.: US 6,301,344 B1
(45) Date of Patent: Oct. 9, 2001

(54) INTELLIGENT PUBLIC TELEPHONE SYSTEM AND METHOD

(75) Inventors: Rolf Meyer, Lakeland; Kenneth L. Bryan, Lake Mary; Raymond F. Felch, Lakeland; Tony L. McBride, Riverview; Gary L. Stirk, St. Petersburg, all of FL (US); Stephen J. Hayes, Gwent (GB)

(73) Assignee: Protel, Inc., Lakeland, FL (US)

( * ) Notice: Subject to any disclaimer, the term of this patent is extended or adjusted under 35 U.S.C. 154(b) by 0 days.

(21) Appl. No.: 09/186,009

(22) Filed: Nov. 4, 1998

Related U.S. Application Data

(60) Provisional application No. 60/064,516, filed on Nov. 5, 1997.

(51) Int. Cl.[7] ................................................. H04M 17/00
(52) U.S. Cl. ........................ 379/145; 379/143; 379/146; 379/155
(58) Field of Search .................................. 379/143, 144, 379/145, 146, 147, 148, 149, 150, 153, 154, 155

(56) References Cited

U.S. PATENT DOCUMENTS

| | | |
|---|---|---|
| 3,387,091 | 6/1968 | Deiker . |
| 3,598,920 | 8/1971 | Fischer . |
| 3,627,950 | 12/1971 | Sand . |
| 3,944,717 | 3/1976 | Hacker et al. . |
| 4,028,494 | 6/1977 | Zarouni . |
| 4,169,216 | 9/1979 | Overdulve et al. . |
| 4,277,647 | 7/1981 | Brolin et al. . |
| 4,547,629 | 10/1985 | Corless . |
| 4,595,983 | 6/1986 | Gehalo et al. . |
| 4,625,078 | 11/1986 | Crouch et al. . |
| 4,636,587 | 1/1987 | Zoerner . |
| 4,675,902 | 6/1987 | Boeckmann . |
| 4,685,124 | 8/1987 | Smitt . |
| 4,759,054 | 7/1988 | Mellon . |
| 4,856,046 | * 8/1989 | Streck et al. .......................... 379/144 |
| 4,860,345 | 8/1989 | Mellon . |
| 4,860,346 | 8/1989 | Mellon . |
| 4,890,317 | 12/1989 | Hird et al. . |
| 4,897,870 | * 1/1990 | Golden .................................. 379/144 |
| 4,908,852 | 3/1990 | Hird et al. . |

(List continued on next page.)

FOREIGN PATENT DOCUMENTS 0 169 507 A2   1/1986   (EP) .

Primary Examiner—Curtis Kuntz
Assistant Examiner—Quoc D. Tran
(74) Attorney, Agent, or Firm—Allen, Dyer, Doppelt, Milbrath & Gilchrist, P.A.

(57) ABSTRACT

An intelligent pay telephone provides local/remote diagnostics, fraudulent call prevention, capability of facilitating local coin overtime operation, complete cash box accounting, and call detail reporting. Information regarding each call placed from the telephone is recorded and is useful in verifying operator service provider communications, long distance bills, local measured usage charges, and call volume discounts, by way of example. The intelligent pay telephone includes a delta-sigma voice driver for reducing circuit complexity and improving circuit reliability, and a one-wire, high speed communication controller facilitates high speed downloading and uploading of pay telephone data, records, and operating program code. The pay telephone also includes a low impedance, low power hookswitch for resisting damage from weather, as well as a pin fraud prevention circuit for deterring fraud. Battery management techniques, memory management, and coin detection circuits add to the pay telephone intelligence and serve to improve system reliability. And, firmware security techniques and operating system formats promote product firmware security and configuration control.

22 Claims, 34 Drawing Sheets

U.S. PATENT DOCUMENTS

| | | |
|---|---|---|
| 4,916,738 | 4/1990 | Chandra et al. . |
| 4,920,558 | 4/1990 | Hird et al. . |
| 4,920,562 | 4/1990 | Hird et al. . |
| 4,932,022 * | 6/1990 | Keeney et al. .......................... 370/60 |
| 4,933,965 | 6/1990 | Hird et al. . |
| 4,933,966 | 6/1990 | Hird et al. . |
| 5,048,079 | 9/1991 | Harrington et al. . |
| 5,090,548 | 2/1992 | Hird et al. . |
| 5,093,858 | 3/1992 | Hird et al. . |
| 5,113,433 | 5/1992 | Hird et al. . |
| 5,131,027 | 7/1992 | Hird et al. . |
| 5,133,005 | 7/1992 | Kelley et al. . |
| 5,136,585 | 8/1992 | Nizamuddin et al. . |
| 5,150,399 * | 9/1992 | Yasuda ................................. 379/143 |
| 5,150,403 * | 9/1992 | Jordan ................................. 379/145 |
| 5,159,698 | 10/1992 | Harrington et al. . |
| 5,168,518 * | 12/1992 | Criscenzo et al. ................... 379/145 |
| 5,206,899 | 4/1993 | Gupta et al. . |
| 5,301,246 | 4/1994 | Archibald et al. . |
| 5,351,290 | 9/1994 | Naeini et al. . |
| 5,353,335 | 10/1994 | D'Urso et al. . |
| 5,381,467 | 1/1995 | Rosinski et al. . |
| 5,388,212 * | 2/1995 | Grube et al. ......................... 395/200 |
| 5,388,680 | 2/1995 | Hird et al. . |
| 5,400,400 | 3/1995 | Hird et al. . |
| 5,412,730 | 5/1995 | Jones . |
| 5,438,607 * | 8/1995 | Przygoda, Jr. et al. ................ 379/38 |
| 5,441,138 | 8/1995 | Hird et al. . |
| 5,463,677 | 10/1995 | Bash et al. . |
| 5,483,581 | 1/1996 | Hird et al. . |
| 5,495,521 | 2/1996 | Rangachar . |
| 5,513,738 | 5/1996 | Hird et al. . |
| 5,546,463 | 8/1996 | Caputo et al. . |
| 5,557,089 | 9/1996 | Hall et al. . |
| 5,625,690 | 4/1997 | Michel et al. . |
| 5,675,627 | 10/1997 | Yaker . |
| 5,684,872 | 11/1997 | Flockhart et al. . |
| 5,745,677 | 4/1998 | Grube et al. . |
| 5,757,896 * | 5/1998 | Akhteruzzaman et al. ......... 379/145 |
| 5,768,315 * | 6/1998 | Mittel et al. ......................... 375/247 |
| 5,778,071 | 7/1998 | Caputo et al. . |
| 5,799,067 * | 8/1998 | Kikinis et al. ................... 379/93.06 |
| 5,896,446 * | 4/1999 | Sagady et al. ....................... 379/146 |
| 5,907,606 * | 5/1999 | Ingalsbe et al. ..................... 379/146 |

* cited by examiner

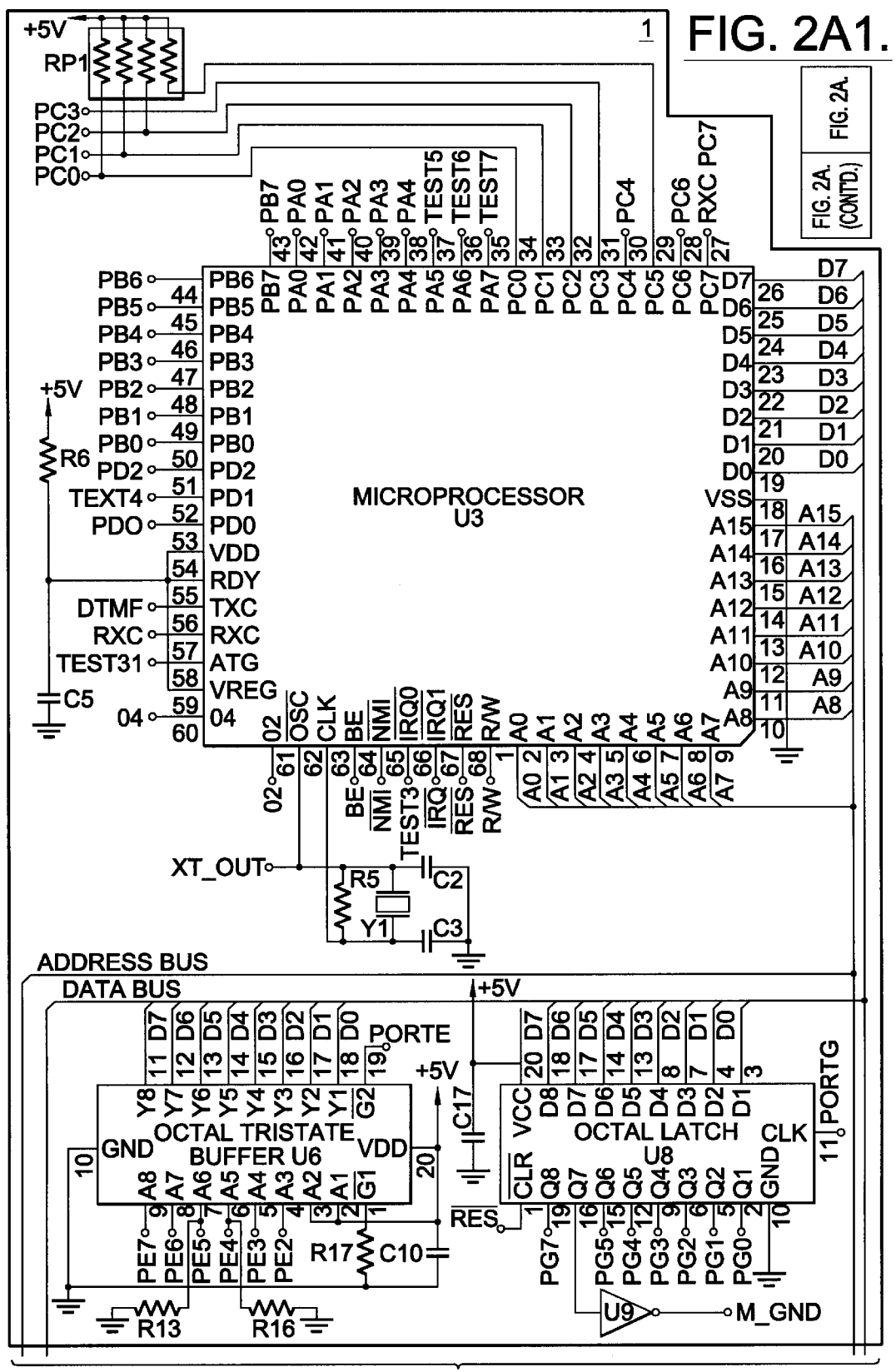
FIG. 2A1.

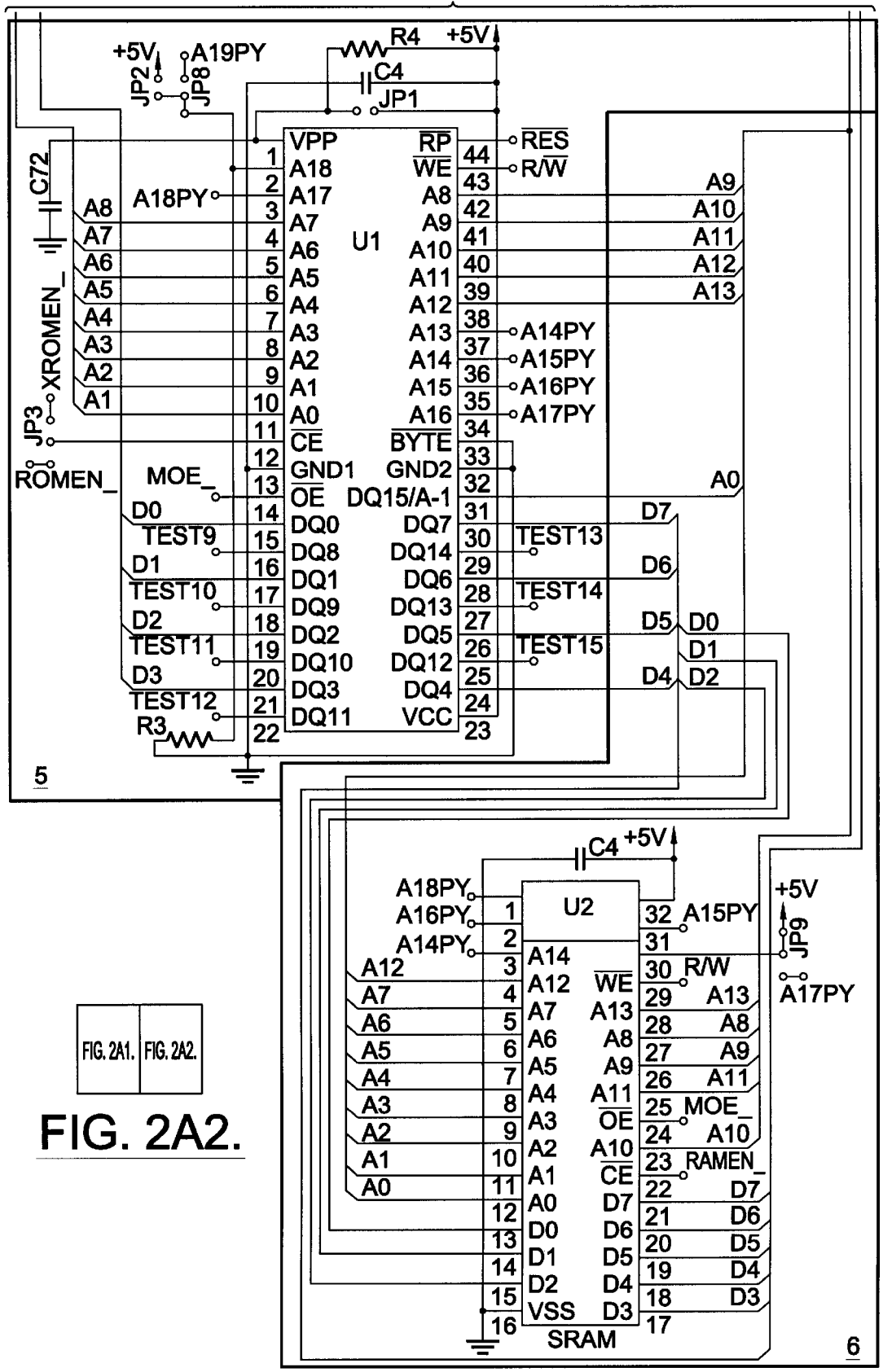
FIG. 2A2.

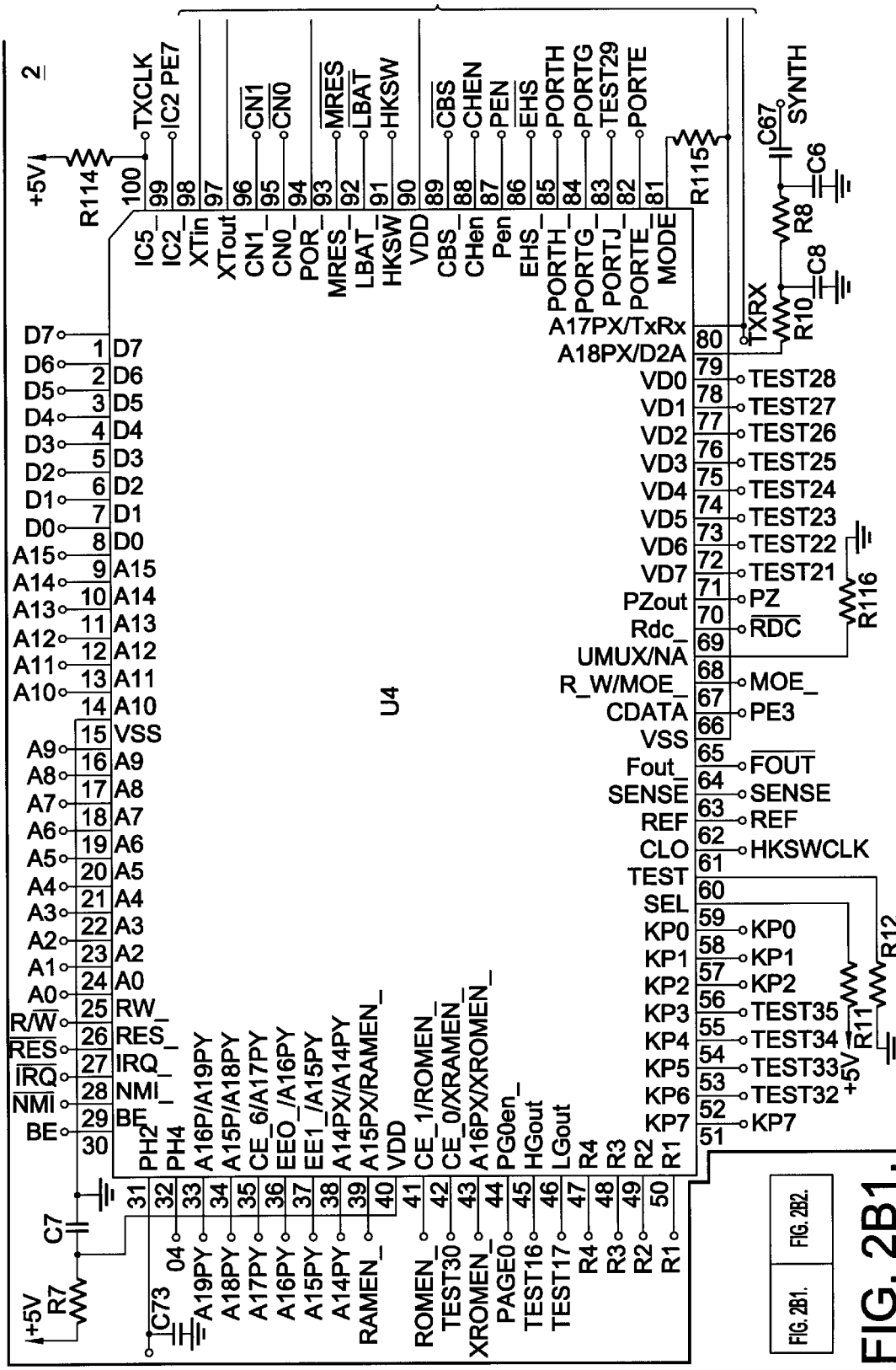
FIG. 2B1.

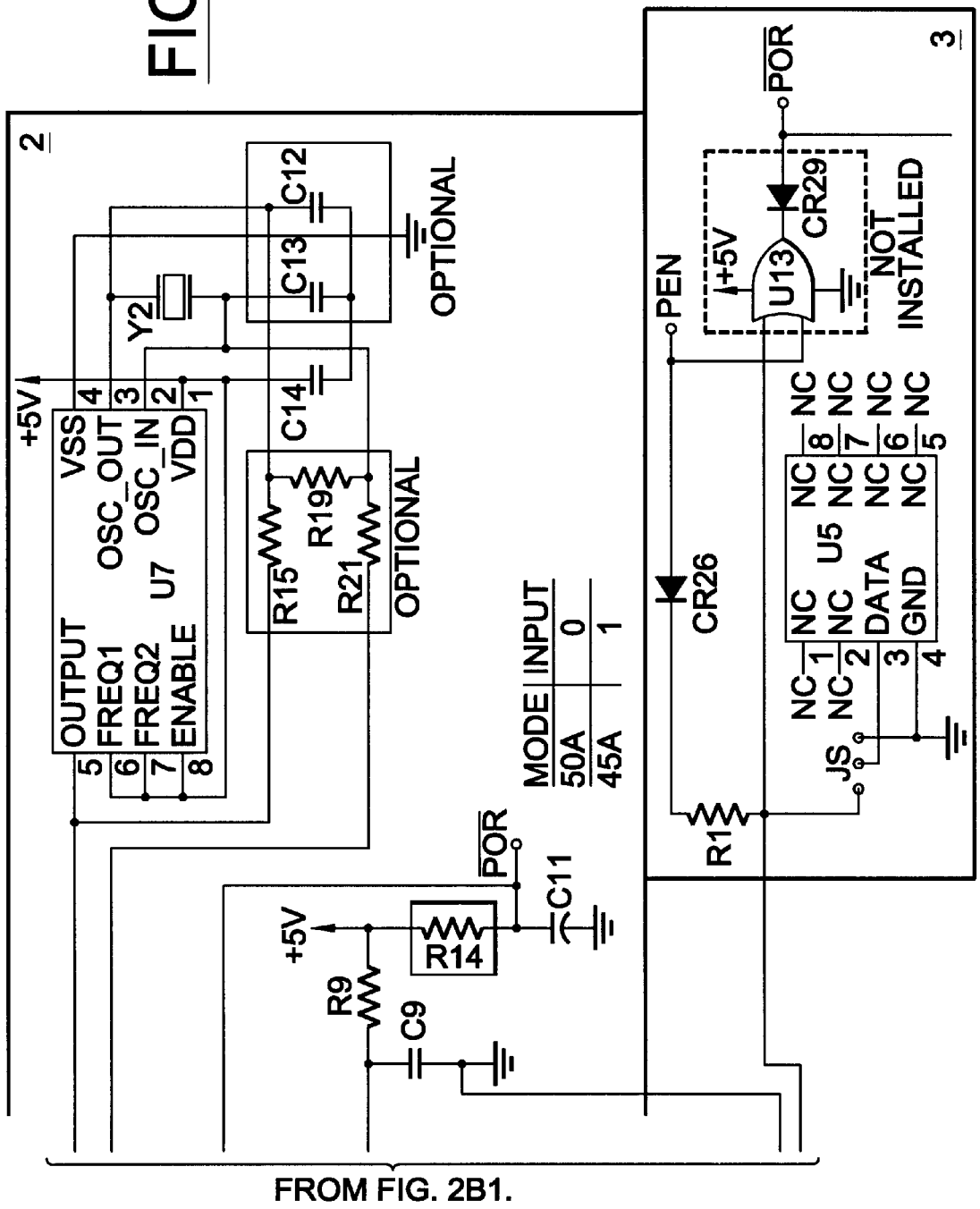

WRITE 0

READ 1

READ 0

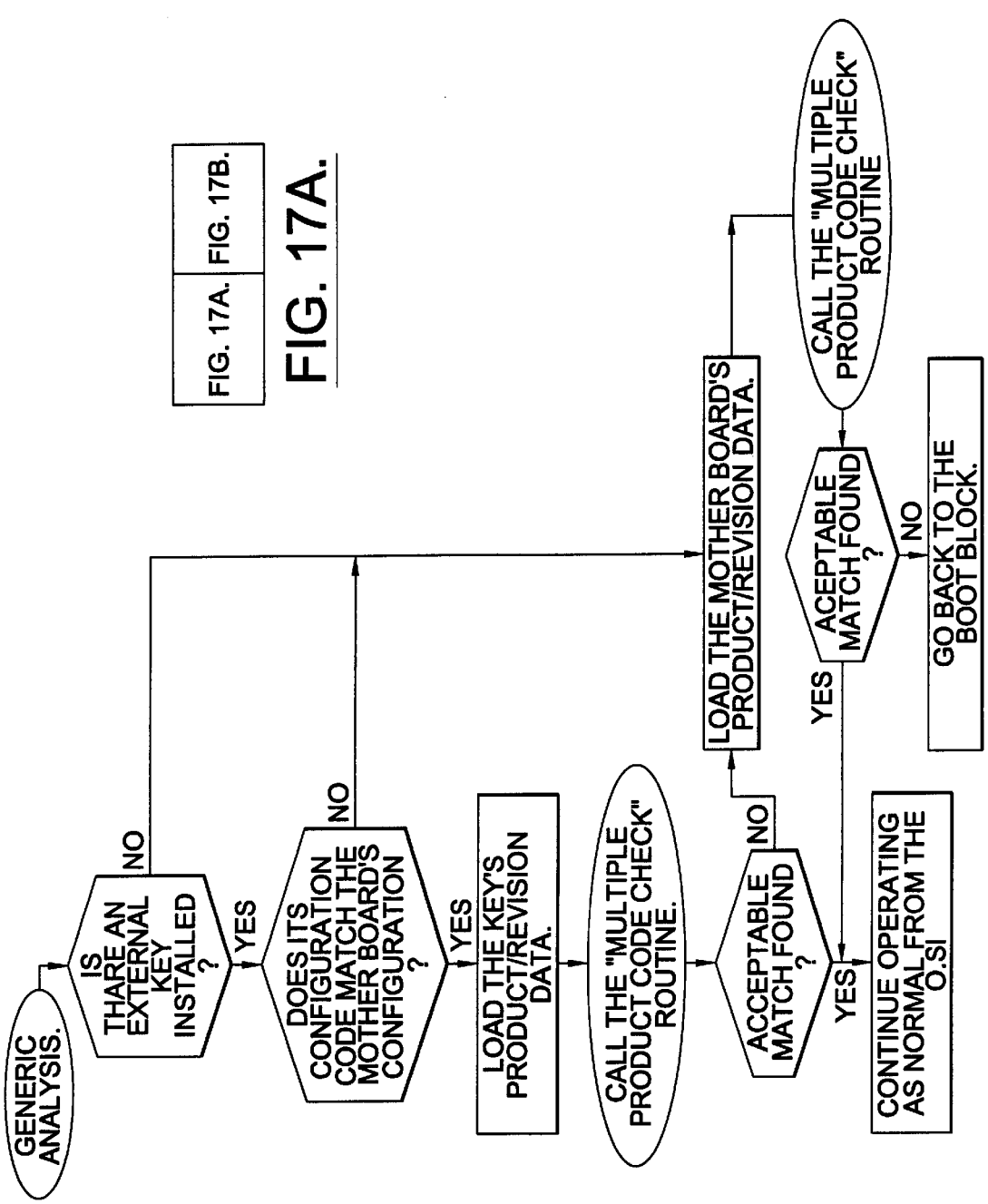

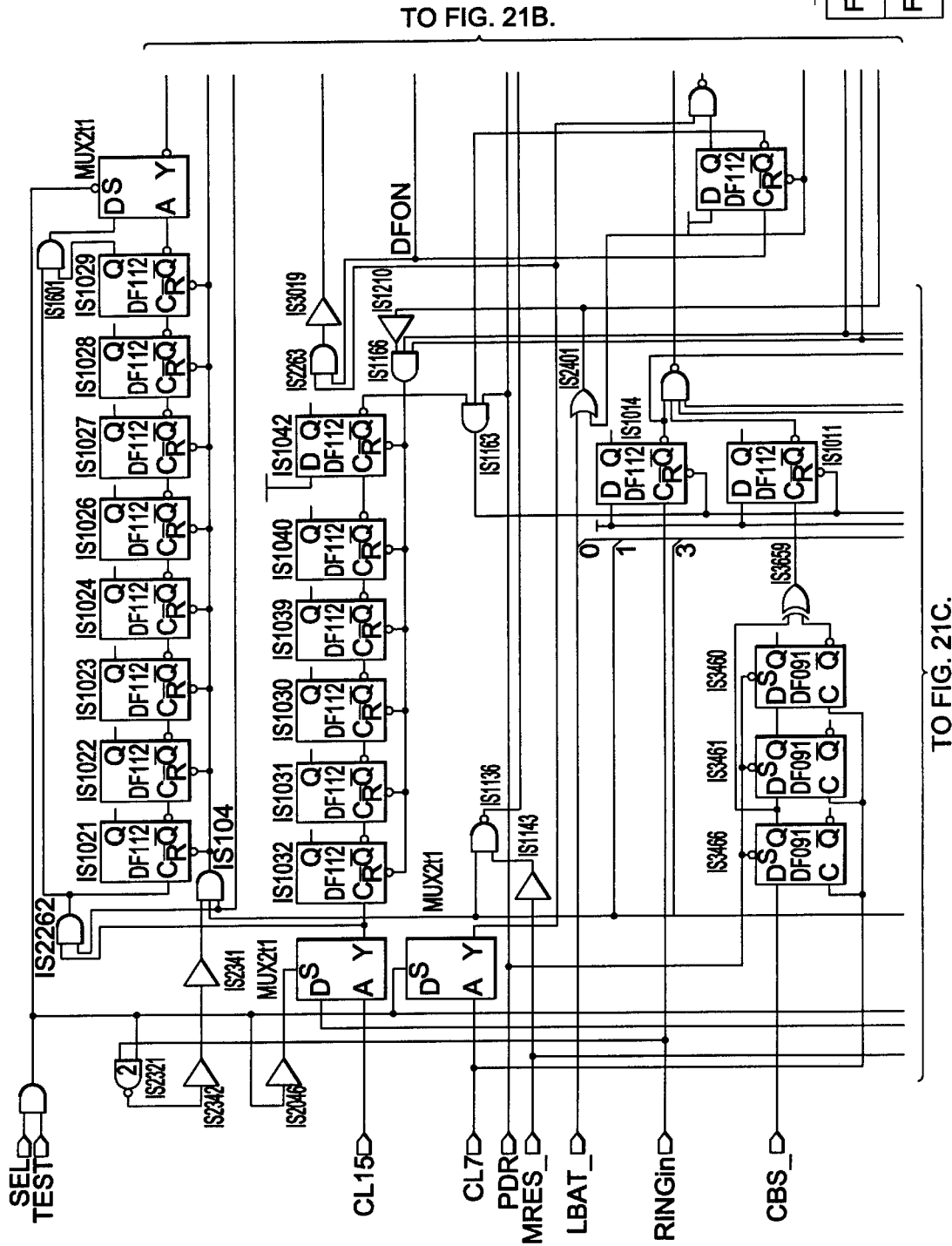

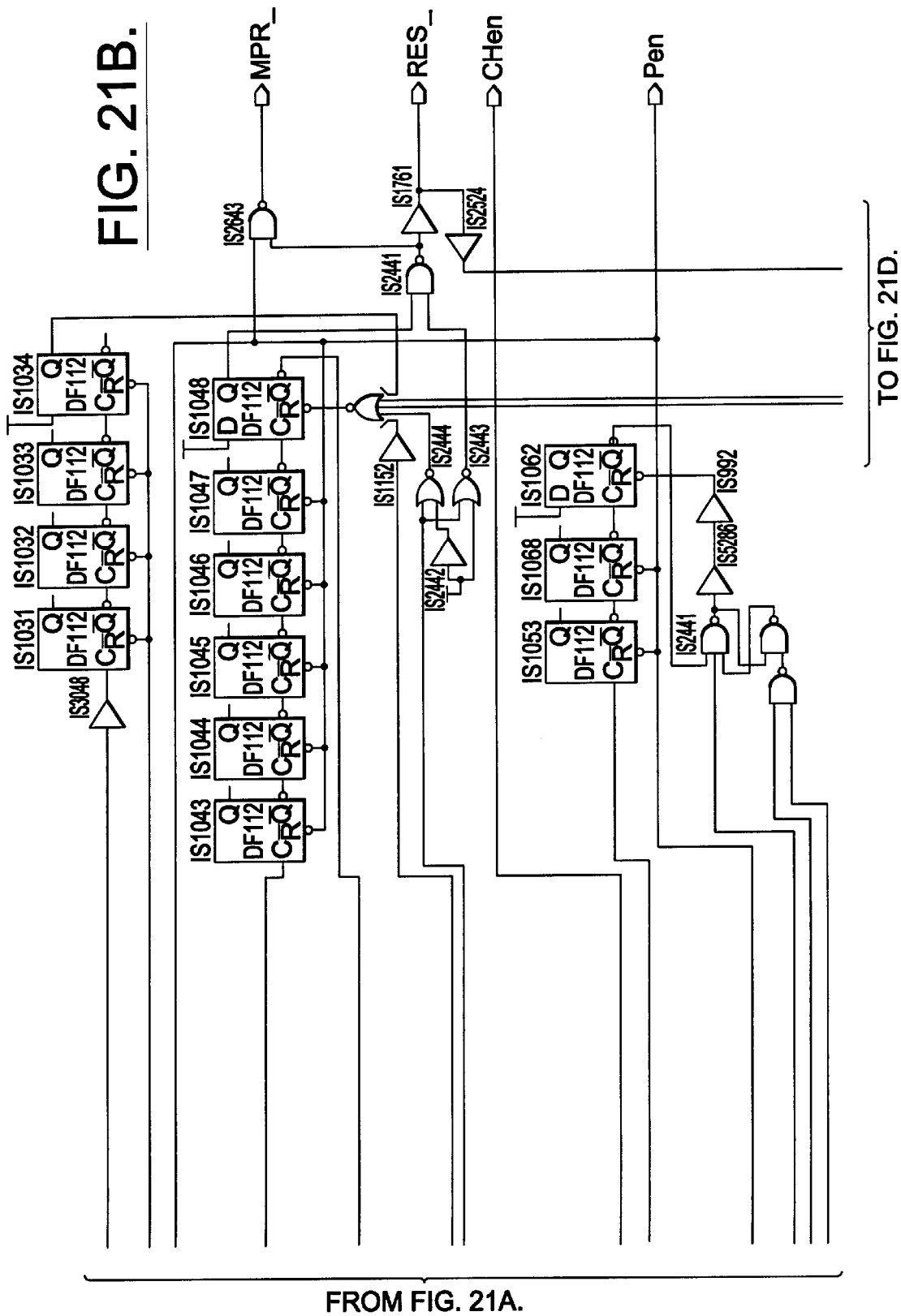

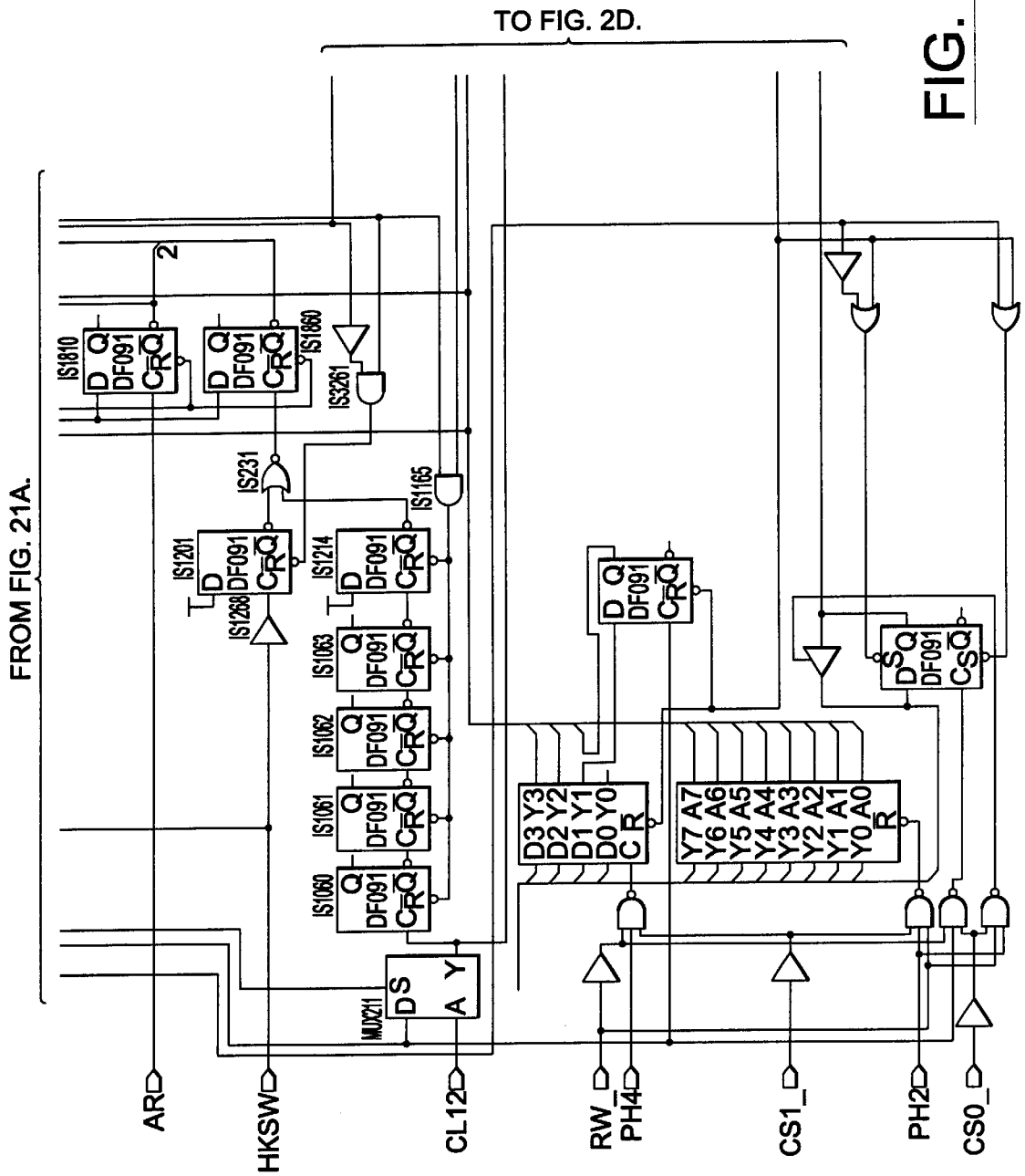

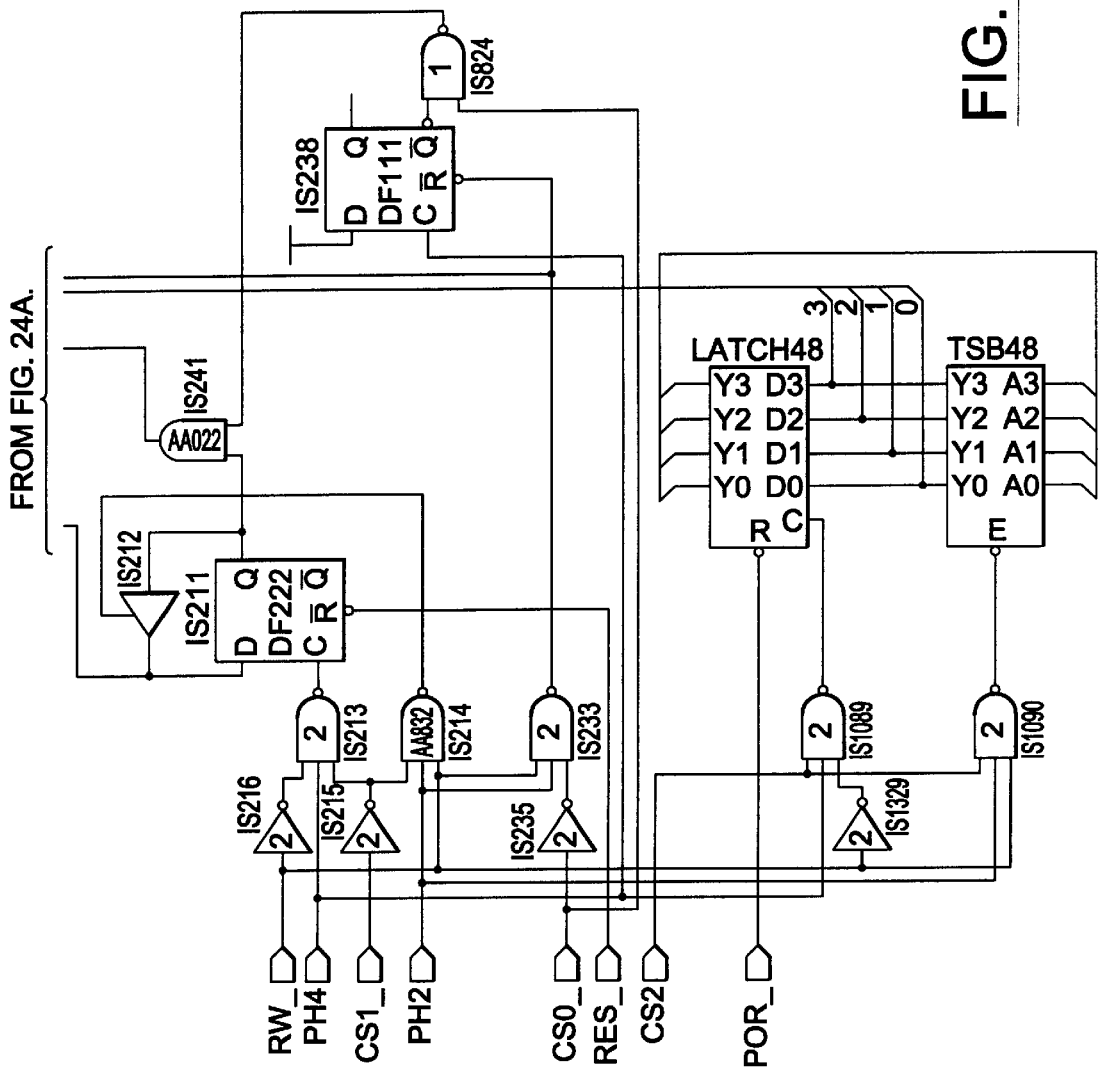

INTELLIGENT PUBLIC TELEPHONE SYSTEM AND METHOD

CROSS REFERENCE TO RELATED APPLICATION

This application for patent is related to and claims the benefit of Provisional Application Ser. No. 60/064,516 filed on Nov. 5, 1997, commonly owned with the instant application, the entire specification of which is incorporated herein by reference.

FIELD OF THE INVENTION

The present invention relates to public telephones and in particular to line powered intelligent pay telephone systems.

BACKGROUND OF THE INVENTION

There is a need for a low cost intelligent public pay telephone. It is desirable that such a telephone be reliable and durable in light of the hostile conditions and environment within which the telephone may have to operate. It is further desirable that this telephone be rich in features that will assure reliable performance.

a) In particular, there is a need to reduce input/output (I/O) pin count circuits used within the present invention for the purpose of incorporating other features requiring I/O reducing cost of circuit functions and improving product reliability.

b) There is a need to reduce microprocessor "bit-banging" (a dedicated CPU-intensive control technique that doesn't allow for simultaneous CPU functionality) when communicating with serial devices used within a telephone system, and to facilitate a reduced-power, high speed method of downloading or uploading pay station data, records, and operating program code, while reducing the product cost and improving product reliability in terms of printed circuit board device interconnections.

c) There is a need to promote software security and to provide a technique of controlling product firmware releases on a per phone basis, to provide unique pay station operation, and to facilitate future firmware or software control on a per phone basis. There is further a need to define a method of controlling firmware configurations.

d) A low power (microamp range), low impedance hook switch interface circuit is needed which is immune to the affects of intruding water, or any other input impedance reducing agent or effect that can cause a false hook switch event or indication. In addition, a method of verifying a circuit oscillator operation (32.768 kHz in this case) in terms of frequency and duty cycle is needed.

e) There is a need to interface the phone chassis with various mechanical coin acceptors that generate a wide range of nickel, dime, and quarter coin pulse widths utilizing a uniform detection algorithm for all coin acceptors. In order to reliably detect the various pulse widths, there exists a need to establish a minimum valid pulse width criteria, and to reject any noise associated for a given coin acceptor mechanism. There is an added need to make coin input filtering less of a CPU intensive function.

f) It is desirable to have a flexible and secure memory page-swapping technique that allows a 64 kbyte direct address range to be expanded, and then be logically repartitioned in a number of segments such that multiple devices in a system can be partitioned in such a way as to not conflict with each other, and further to write-protect all memory on a segment resolution basis.

g) The ability of determining the condition of the phone's primary battery for the purpose of assuring proper phone operation of future battery-dependent functions.

h) There is a need to prevent pin fraud on coin telephone trunk applications.

Pin fraud is a common method of defrauding the telephone. One pin fraud technique includes inserting a fine pin into any one of the four handset interconnect wires within an armored handset cord (provided the interconnect is not ac coupled or isolated in some way) and shorting the pin to the metallic armored cord which is connected to earth ground. This event must take place at the time the central office is performing a local call coin check. Shorting a +5V referenced signal to earth ground will complete the circuit loop, and as a result be interpreted by the central office that the minimum deposit has been satisfied, thereby enabling the call. Another pin fraud technique includes inserting a pin into the armored handset cord as described previously at the time of a post call collect signal application, thereby diverting the collect signal from the escrow relay. Then, upon removing the pin and coming off-hook and going back on-hook, which prompts the central office to send a refund signal to the phone, any money held in escrow from a long distance coin call will be returned instead of collected.

SUMMARY OF INVENTION

In view of the foregoing background, it is therefore an object of the present invention to provide a low cost, high value intelligent pay telephone having proven reliable technology combined with durability and feature rich performance.

These and other objects, features and advantages according to the present invention are provided by an intelligent public telephone system having:

a) AN ADPCM synthesized voice driver using Delta Sigma technology, thereby converting the output pin count from 10 pins to 1 pin, reducing the cost and complexity of voice synthesizer associated circuitry external to an ASIC. The Delta Sigma modulator is a second-order modulator followed by a simple, two-pole, passive filter. The human ear or telephone line serves as the third filter pole.

b) Implemented a single I/O controller circuit in the telephone control ASIC capable of 115 kbps bidirectional data communication. The circuit's protocol is compatible with the slower Dallas Semiconductor one-wire protocol to facilitate a non-bit-banging interface to Dallas Semiconductor devices that incorporate the one-wire design. The one-wire controller is used to provide communications with option board assemblies, future option board assemblies, the resident electronic serial number device, the add-on Firmware Control Key interconnect, future Smart Bezels, future custom ASICs, and for interfacing to product programming and/or data acquisition devices that interface to the pay station product in a hard-wired plug-on fashion, or through a local infrared transceiver interconnection. Again, the solution is implemented by a single wire circuit interconnection tremendously reducing printed circuit board complexity, facilitating product cost reduction through reduced circuitry and facilitating reduced printed circuit board layer count. For these same reasons, the single wire solution improves product reliability.

c) A custom-programmed Dallas Semiconductor DS2502 Electronic Serial Number Device is provided in conjunction with a 3-pin header that will interface with an add-on circuit module, or key. The custom-programmed Dallas device is programmed with a unique code. The device is further programmed by the supplier. To enable future firmware programmed, or to be programmed, into the phone and to be secured, a second uniquely programmed customized Dallas DS2502 device is installed onto the 3-pin header.

An alternate solution is to program a random number, or "seed", into a customized device, such as the inventor customized Dallas DS2502, or a custom ASIC, by way of example, and to program a unique serial number (S/N) into the phone's non-volatile memory. A firmware algorithm creates a soft "key" based on the ASIC "seed" and the S/N. The "key" will be used to enable future firmware/software programmed, or to be programmed, into the phone and to be secured.

To provide for the security required, three parameters will be implemented. The three parameters include Configuration Code, Product Code, and Revision Level.

d) A hook switch is provided to satisfy the need for low power, low impedance hook switch interface that is immune to the effects of intruding water, by way of example, and the need to verify circuit oscillator operation. The oscillator measurement solution consists of the HKSWclk signal itself, as the 45 μsec low going pulse represents the 32.768 kHz oscillator frequency period plus the high time portion of the period, while the 125 msec overall HKSWclk signal period represents 4096 times the period of the 32.768 kHz oscillator frequency. Either of these specifications being off would be indicative of which oscillator specification is not correct.

e) A coin detect and debounce circuit is provided that is programmable for minimum pulse width. Pulse widths less than the programmed minimum are ignored. Pulse widths greater than the programmed minimum will generate a microprocessor interrupt (if enabled). The microprocessor can then monitor and measure the remainder of the signal pulse width. This solution allows for signal debounce based on the specific coin acceptor being used, or any redefinition of any coin acceptor output specification. In addition, this circuit performs filtering and thereby improves general system performance by off-loading microprocessor CPU time.

f) A multifunction phone peripheral application specific integrated circuit (MPP ASIC) provides several memory related services, including memory mapped I/O decoding which are accessible to the firmware program through memory mapped registers.

g) Two techniques are implemented for the detection of low battery power and insure that the pay telephone can be made operational for modes of operation requiring more power than the local loop can provide. One technique involves the use of an escrow relay control circuit for the pay telephone where firmware is used to monitor time required to successfully charge an escrow firing capacitor, and based on this time, estimate the general status of the battery. A self-diagnostic functional circuit test is performed for telephone products which are battery dependent. In this case, the test would be performed with the telephone line seized, thereby preventing the phone from "crashing" in the event of a low battery condition.

A second technique places a known load across the battery, again while the telephone line is seized preventing a phone "crash" in the event of a low battery. While the known load is across the battery, the battery voltage is directly measured. In utilizing either technique by applying a known load across the battery at various times or intervals, or by applying different loads across the battery single or multiple times, firmware algorithms determine if the battery is in a sufficient condition to support the pay telephone in performing some future function requiring the battery. The firmware may then invoke a battery conditioning mode of operation and/or report the condition for potential service. These techniques also facilitate identifying a disconnected battery.

h) As earlier described, pin fraud is perpetrated by shorting handset interface signals to earth ground during central office coin checks or coin collections. This provides a low impedance path between TIP and earth ground which is precisely the signaling indication the CO is looking for. Pin fraud prevention circuitry is provided which limits the amount of current that can flow through the handset interface leads. This current limit is set up so that the carbon transmitter has sufficient bias current to operate but the central office (CO) would not detect a coin ground presence.

BRIEF DESCRIPTION OF DRAWINGS

Preferred and alternate embodiments of the present invention are described, by way of example, with reference to the accompanying drawings in which:

FIGS. 2A–2I include schematic diagrams of a preferred embodiment of FIG. 1;

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited by the embodiments set forth herein. Rather, these embodiments are provided so that this disclosure will be thorough and complete, and will fully convey the scope of the invention to those skilled in the art. Like numbers refer to like elements throughout. Further, since it is understood by those skilled in the art that a variety of desirable components and devices can be included in the environment of the present invention, only those pertinent to the present invention or useful by way of example will be discussed.

General Operation

Figure 1:
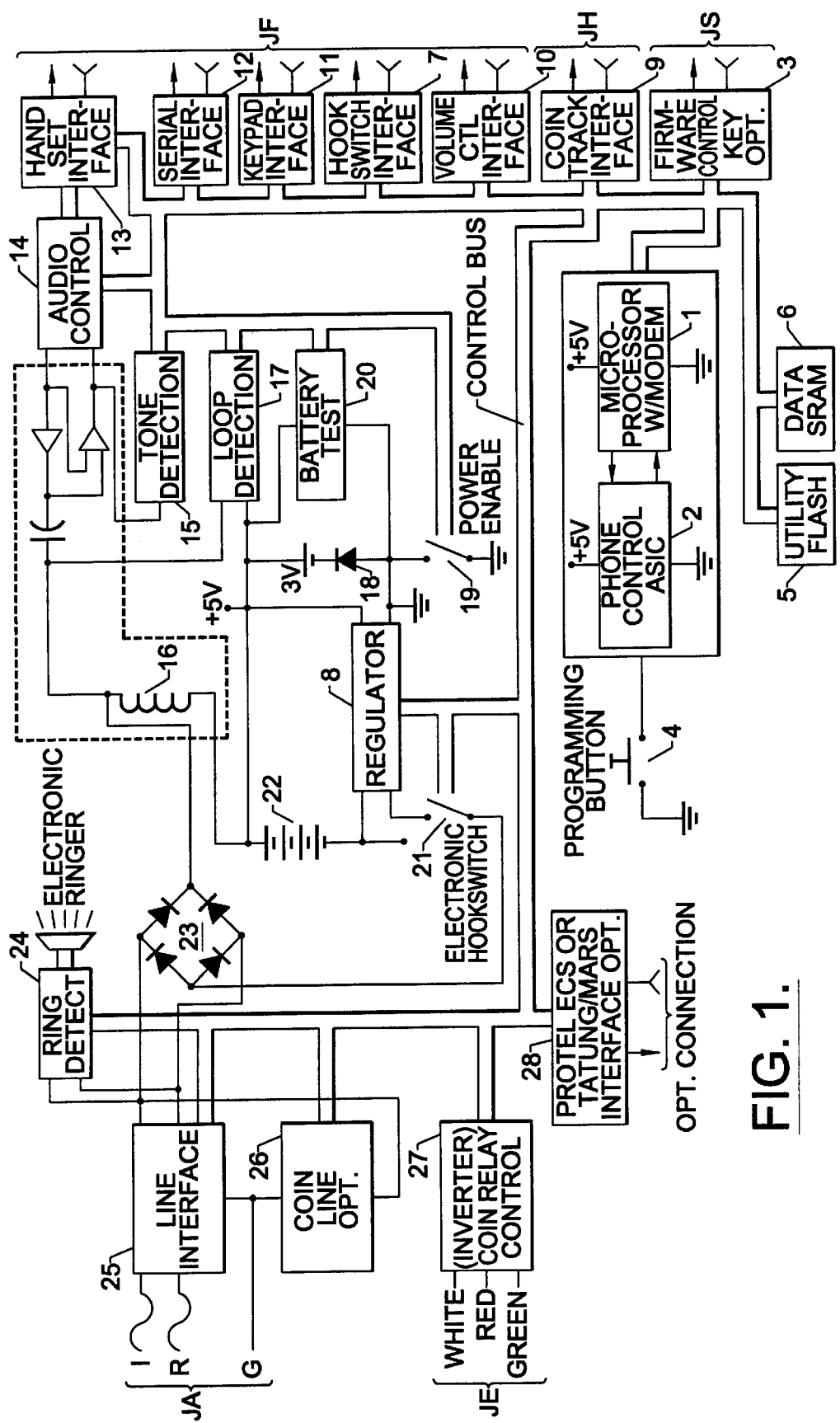
FIG. 1 is a block diagram illustrating operation of an intelligent pay telephone of the present invention.

With reference initially to the block diagram of FIG. 1, functions of the pay telephone of the present invention are illustrated and referenced through numerals 1 through 28. The intelligent public telephone of the present invention is loop-start, line powered type. In the idle on-hook condition, the phone draws no current from the telephone line by holding the loop open. The phone is battery powered in the idle on-hook condition with minimal circuitry powered drawing current in the micro-amp range. Certain events will initiate the telephone electronics to turn on the electronic hookswitch, thereby seizing the telephone line. The telephone circuit is powered at the same time the electronic hookswitch is closed. As soon as the minimum operating voltage for the microprocessor is attained, the microprocessor 1 is allowed to power up. Once the microprocessor 1 is powered up, the system firmware loaded in the EPROM is in control of the telephone operation. FIGS. 2A through 2I illustrate preferred embodiments of circuits for the present invention, and are enclosed within blocks numbered for reference to numbered blocks of FIG. 1.

The ringer circuit 24 is comprised of two sub-circuits: a ring detect circuit and a ring driver circuit. The circuit is designed to detect and ring when standard ring signals in the 15.3 Hz to 68 Hz frequency range are applied.

The phone ringer, an electromagnetic transducer, will be excited by the phone control ASIC coincident with a qualified ring-in signal. The phone ringer is dependent on the primary NiCad battery to sound.

The pay telephone of the present invention is line powered. The minimum loop requirement for reliable long-term operation is 20 mA. This allows the phone to operate properly over temperature extremes including −40° C. to −70° C. for varying length telephone calls. The power supply consists of a parallel shunt regulator circuit, a nominal 4.8V NiCad battery, and a 3.0V lithium battery.

The NiCad battery serves as a rechargeable source of reserve power. Its primary function is power the phone's escrow relay used to collect and refund money deposited into the pay station. Although most circuits are powered down in the on-hook state for the purpose of conserving energy, the few circuits remaining active in the on-hook state are powered by the system NiCad battery. In addition, the NiCad battery is intended to power the phone during any short periods of intentional central office controlled open loop intervals during the phone's off-hook operation.

The 3.0V lithium battery is a back-up battery providing energy to circuits whenever the NiCad battery is discharged below 3.0V, or whenever the NiCad battery is removed from the circuit.

A loop detect circuit 17 allows the microprocessor to determine when the central office opens the telephone loop.

A tone detector circuit 15 is used in conjunction with the system microprocessor to detect signals such as dial tone, ring back, and to perform the answer recognition function required for initiating the chargeable pay period of a call.

An audio control circuit 14 consists of a microprocessor controlled transmit channel and receive channel. Both channels have multiplexed inputs, as well as some gain control.

Transmit channel inputs include the handset transmitter output, voice synthesizer output, modem output (either microprocessor generated FSK or the external Bell 212A option), microprocessor generated DTMF, or an auxiliary signal from an option type circuit. The transmit channel output is to the 2w to 4w converter.

Receive channel inputs include the receive output of the 2w to 4w converter, a microprocessor generated single frequency output, keypad, confidence tones, voice synthesizer output, and microprocessor generated DTMF. The receive channel output is to the handset receiver.

The telephone is designed to communicate with the phone management system via a proprietary 1200 baud FSK algorithm. Typically, modem communication is used to poll the installed telephone for call record, call accounting, and diagnostic information, or for downloading program, rating, or system configuration information.

Handsets with either a carbon microphone element or a dynamic microphone element can be used via the handset interface 13.

The telephone interfaces at a hookswitch interface 7 with a passive hookswitch that is normally open in the on-hook state.

A port at a serial interface 12 is controlled by the system microprocessor.

A keypad interface 11 provides connection to a passive XY-matrix type keypad standard.

A volume control interface 10 is provided for connection to a normally open, passive, external volume control switch for the purpose of providing hearing-impaired handset receiver gain.

A standard passive mechanical trigger switch interconnect is provided for US nickel, dime, and quarter coins through the coin track interface 9.

The telephone operates an industry standard AE-style 48 V escrow relay. The system firmware determines when it is appropriate to operate the relay in either the collect or refund mode of operation. An inverter circuit 27 is provided that drives the relay from the 4.8 V NiCad battery. The relay driver primarily consists of the voltage charging circuit and the charged voltage threshold detection circuit.

An option card interface 26 has been designed into the product that allows for operation of a coin-type telephone line.

The primary system memory components are the utility FLASH 5 and data SRAM 6. The phone always boots up from the utility FLASH. The utility FLASH is a downloadable device containing boot code, standard utilities, and voice data. The data SRAM typically contains call rating information, as well as collected call records. Any of these typical uses may vary by firmware design.

A real-time clock circuit resides in the telephone control ASIC 2. A few of the functions of the real-time clock include time and date stamping calls made, timing call duration, and time and date stamping diagnostic events. In addition, voice synthesizer function circuitry resides in the phone control ASIC. All synthesized voice messages are stored in the phone's utility FLASH memory. The phone firmware controls the playback of the stored voice by decoding the encoded data using the reverse algorithm. Typical applications for voice messages include dialing instructions, call rating, and phone service diagnostics to name a few.

A one-time programmable electronic serial number device allows for remote product traceability, as well as theft deterrence. The device is programmed at time of manufacture and contains the same number that is labeled on the printed circuit board assembly. Each option board added to the main assembly has its own electronic serial number device. The option board serial number devices also contain a code identifying the option. The system microprocessor identifies the total product configuration by reading all electronic serial number devices.

The line Interface circuit 25 provides the interface between the local telephone loop and the general features of the pay telephone. It is comprised of line surge protection, noise filtering, and polarity guarding and detection circuitry.

A low battery detect circuit 20 detects low battery conditions. As illustrated with reference to FIG. 2G, a 50 mA load is applied under microprocessor control (PC3 low) and battery voltage is measured. The battery pack is expected to provide greater than 4.65V when delivering the 50 mA to the load. If the battery capacity is sufficient, the output of the comparator (PC2) will be a logic high level. This circuit is composed of transistors Q15, Q16, ½ of comparator U12, capacitor C54, zener CR22, and resistors R87–R90, R92, R95, R99. It is expected that this circuit not be utilized on every call and only during times when loop current is present. Note that the actual load placed on the battery will vary slightly due to loop length because of the amount of current that can flow through the battery charging circuitry in regulator hybrid RP4. Due to the potential problem of corrupting the operating system during downloads or any time power in excess of that provided by the local loop is needed, it is imperative that this circuit or some other method be used to monitor battery quality before this type of operation occurs.

Figure 4:
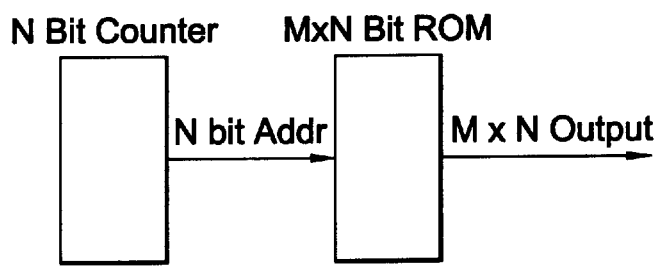
FIG. 4 is a block diagram illustrating an implementation of a Pulse Coded Modulation encoded sine wave.

Implementation of PCM (Pulse Coded Modulation) encoding of a sine wave is accomplished through a simple counter and ROM lookup table. A block diagram of this implementation is shown in FIG. 4.

This implementation simply has an N bit counter whose depth is equal to the number of samples per cycle of sine wave output. This is then fed to a M×N ROM lookup table which stores the PCM codes for the addressed portion of the sine wave. Gate implementation of this approach is not too severe as long as the samples per cycle and the resolution of the output are not too demanding. A sine wave generator with up to 64 points per cycle and an 8 bit output would require approximately 60 gate equivalents for the counter (N+6@10 gates per bit) and a 512 bit ROM (M=8×2$^{N(N=6)}$). Thus, a typical implementation would result in about 600 gates, and even with a logic reduction on the ROM of ¼ gate per bit, 200 gates would still result. As the number of samples per cycle increases and the resolution of the output increases, this number grows to significant gate counts. For example, for 256 points per sine wave and a 10 bit output, over 2500 gates would be required. This implementation also has the disadvantage that if output level control is required then the gate count increases by a factor of the number of output levels required.

An implementation that improves on this approach and provides less gates to implement and provides full level control without any significant increase in gate count is implemented in this invention. It is based on the well known differential equation expression for a sine wave:

$$Y''+\omega^2 Y=0$$

Figure 5:
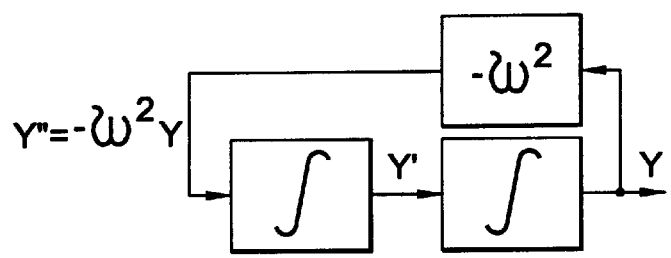
FIG. 5 is a block diagram illustrating a differential equation of a sine wave.

The above equation may be rewritten as $Y''=\omega^2 Y$. Knowing that Y may be obtained by simply integrating Y" twice and if the input to the first integrator is $-\omega^2 Y$. The block diagram of this approach is shown in FIG. 5.

Figure 6:
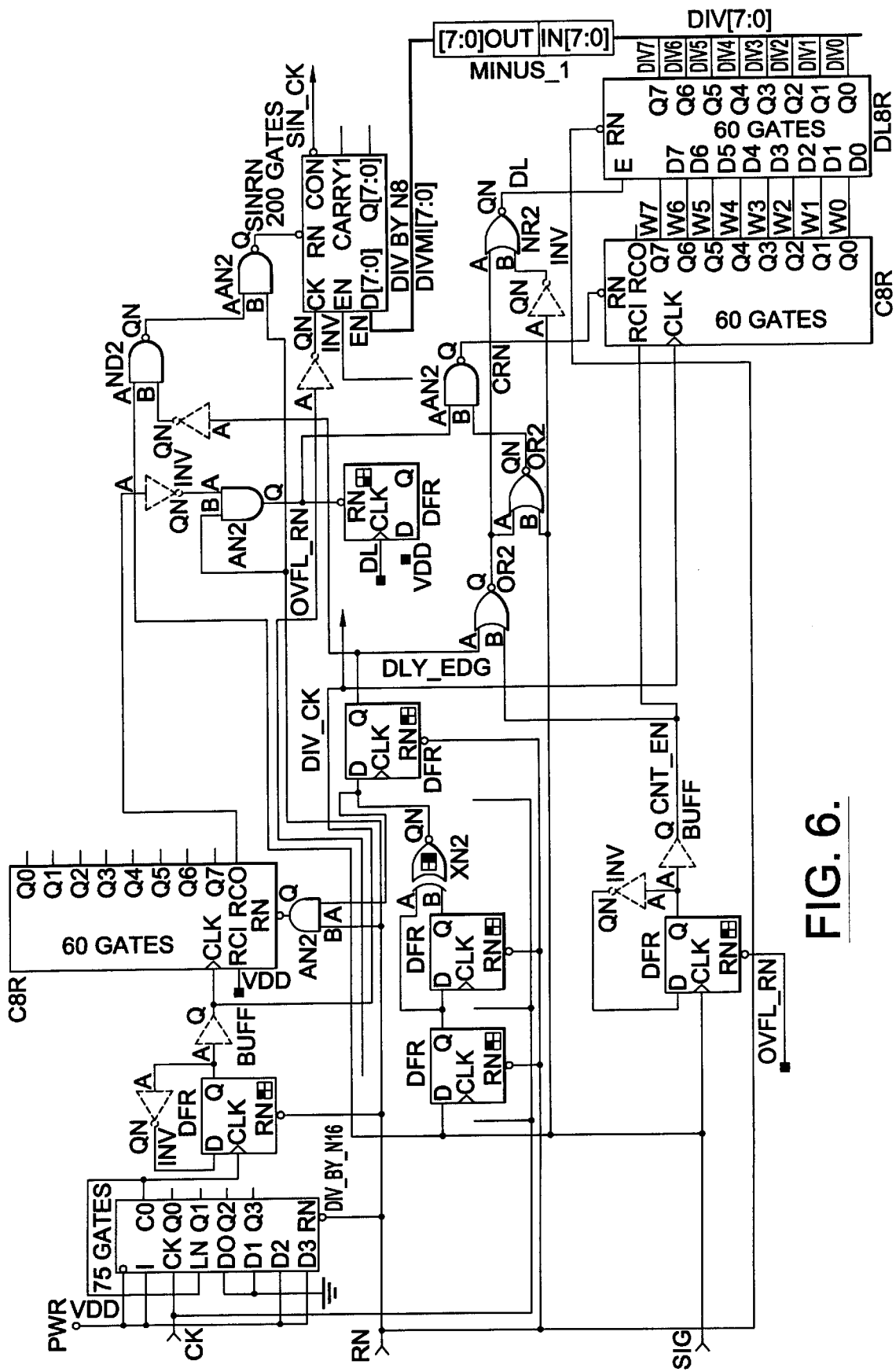
FIG. 6 is a schematic diagram illustrating a logic implementation of FIG. 5.

Logic implementation of this is illustrated in FIG. 6. The integrators are simply digital accumulators of the proper bit dimensions and $\omega^2$ is accomplished simply by shifting the output by binary increments. The implementation shown in FIG. 6 is for a 50 sample per cycle, 10 bit resolution sine wave output. The first integrator output (Y') is set to reset to 0 and the second integrator output (Y") is set to reset to the $V_{PEAK}$ value of the sine wave. This meets the initial value requirements of a cosine wave (sine wave shifted by 90°) which are $VI_{TO}=V_{PEAK}$ and $VI_{TO}=0$.

a) DELTA SIGMA VOICE DRIVER FOR ADPCM

A delta/sigma modulated output from ASIC U4 pin 79 provides synthesized ADPCM decoded voice on a single output pin. Keypad confidence tones are delta/sigma modulated and are an output on the same pin. DC voltages and generic sine waves can be generated at this output pin in conjunction with custom firmware, as well.

Typical implementation of delta-sigma (a/k/a "sigma-delta") modulators involves the conversion from an analog signal to a digital bitstream. The delta-sigma technology is such that the characteristics of this bitstream produce noise which is spectrally distributed (noise shaped) in a manner which allows for simple filtering at sample rates much lower than conventional techniques. This is accomplished by suppressing noise in the signal band of interest and allowing higher levels of noise in the out of band spectra.

Figure 7:
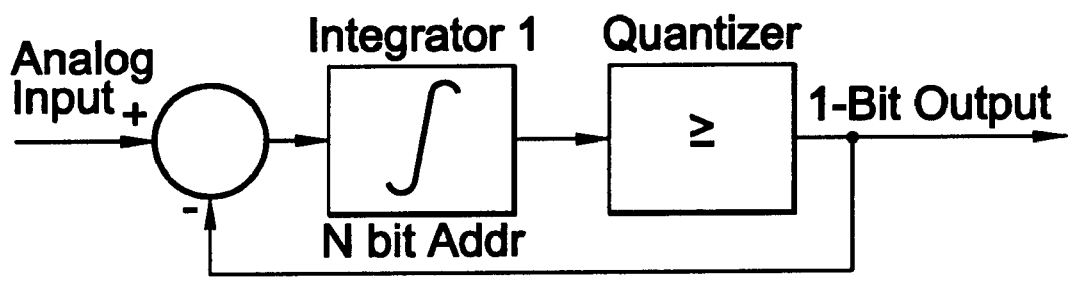
FIG. 7 is a block diagram illustrating implementation of a first order analog delta sigma modulator.

This shaping is accomplished by integrating the error between the digital (single bit) output and the analog input. A first order modulator is shown in FIG. 7.

As illustrated with reference to FIG. 7, the digital output is used as an analog value and subtracted from the actual signal. This produces an error between the desired output (analog) and the actual output (quantized analog or digital). This error is integrated which causes the output to go to the opposite state (i.e., from low to high or high to low). The net result is that the average (filtered) value of digital bitstream produced is equal to the analog input.

Figure 8:
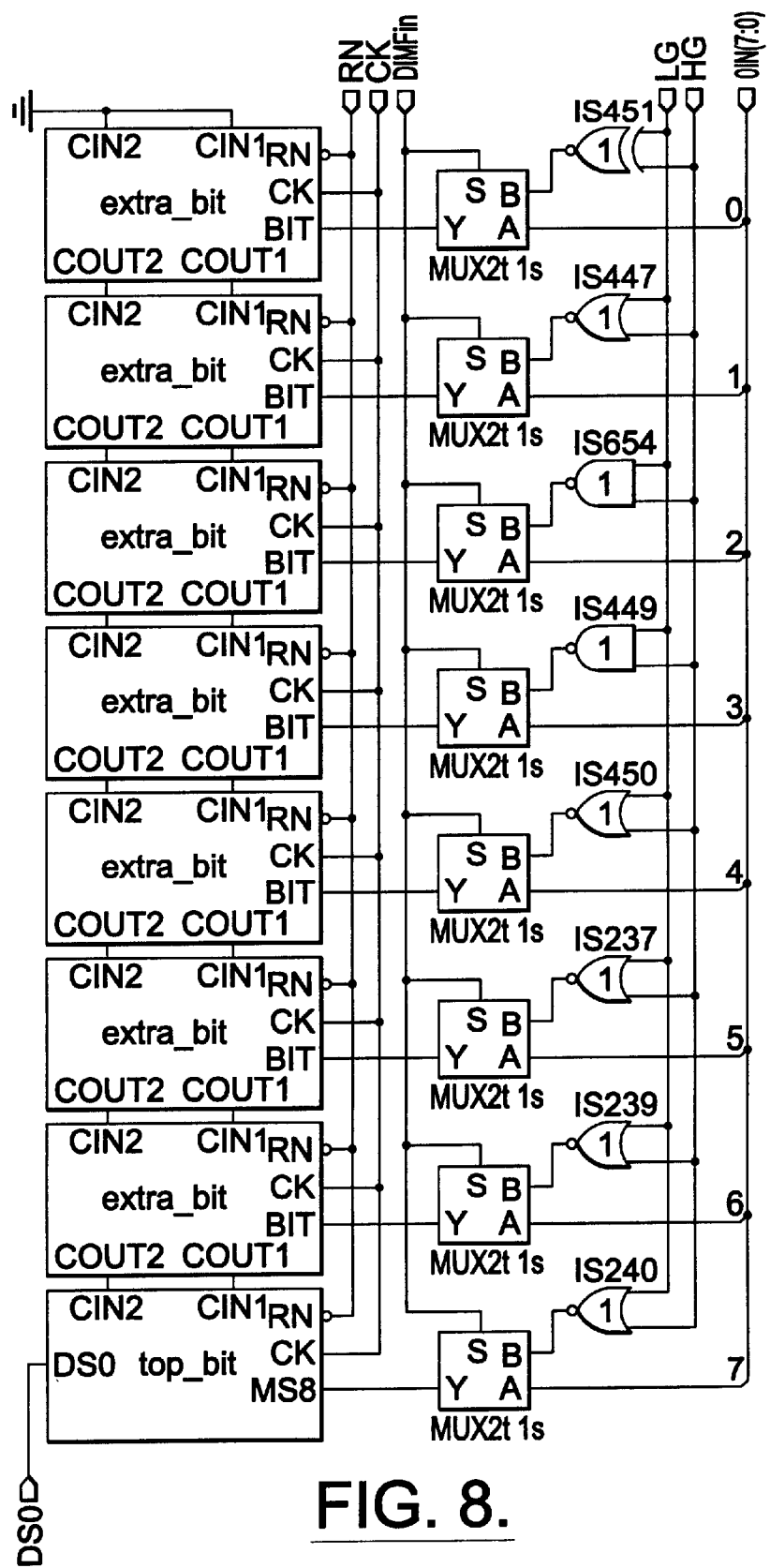
FIG. 8 is a schematic diagram illustrating a preferred embodiment of an eight-bit delta sigma modular circuit.

The circuit of the present invention, illustrated with reference to FIG. 8 (8 bit DSM schematics), extends this concept to the digital domain where the analog input is replaced with a digital value (scaled to represent an analog value) and the analog integrated and quantizer are replaced with digital equivalents. In this implementation two integrators are provided, which produce even greater noise shaping and lower sample rates.

Figure 9:
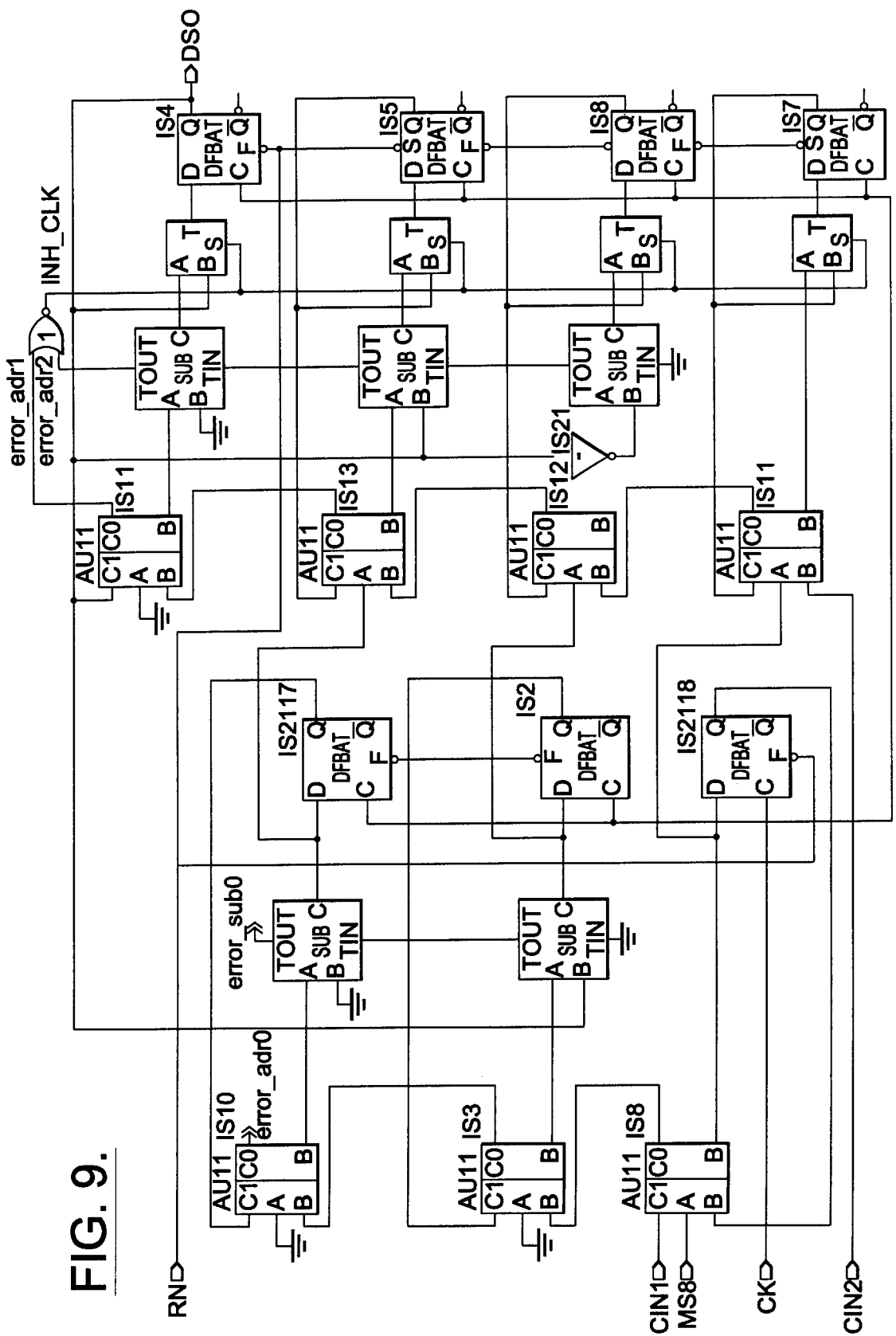
FIGS. 9 and 10 are schematic diagrams of supporting lower level schematics, top-bit and extra-bit, respectively, of FIG. 8.
Figure 10:
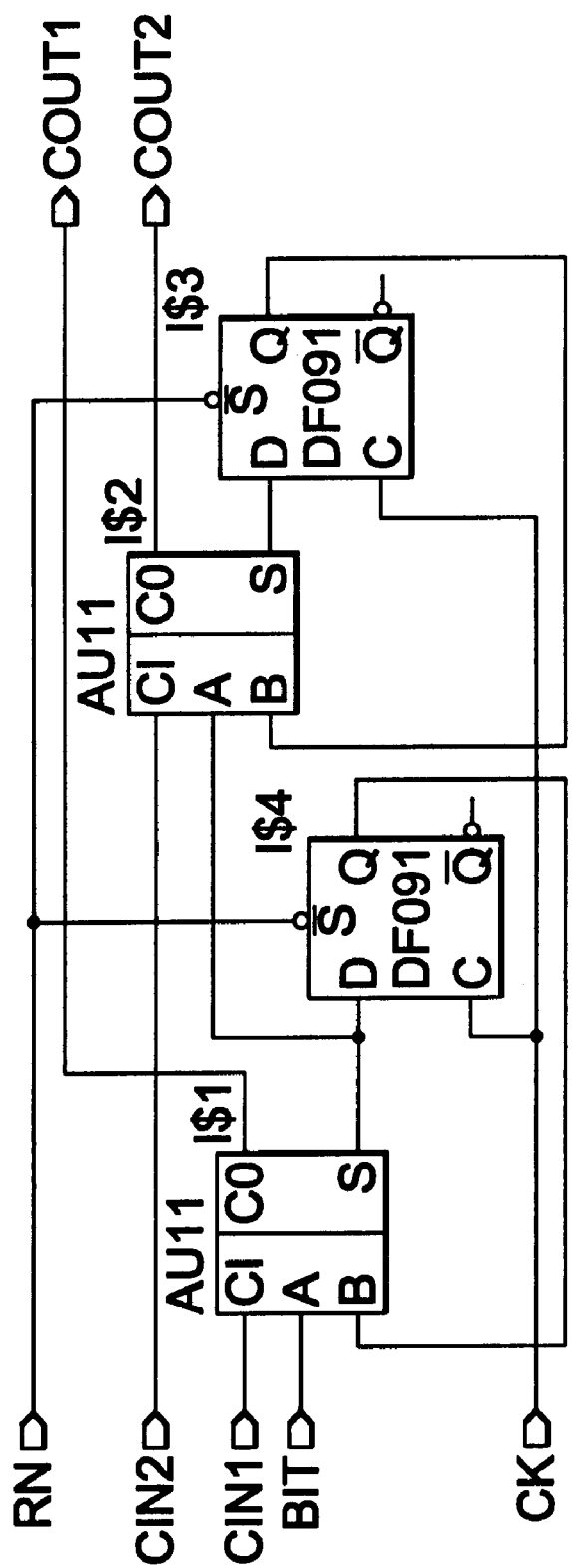
Figure 11A:
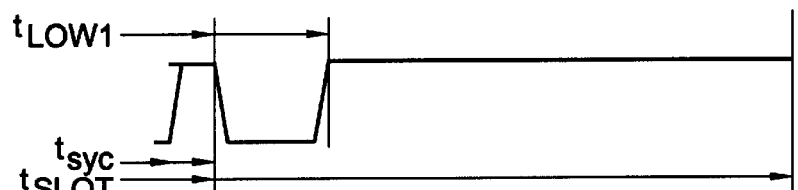
FIGS. 11A–11D illustrating timing signal waveforms associated with a serial interface of the present invention.
Figure 11B:
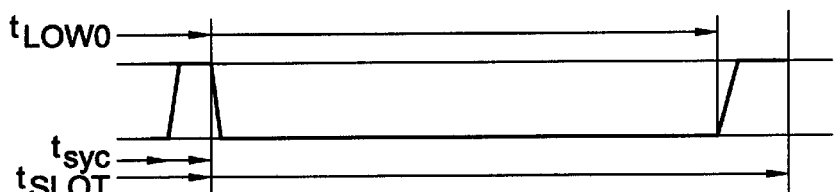
Figure 11C:
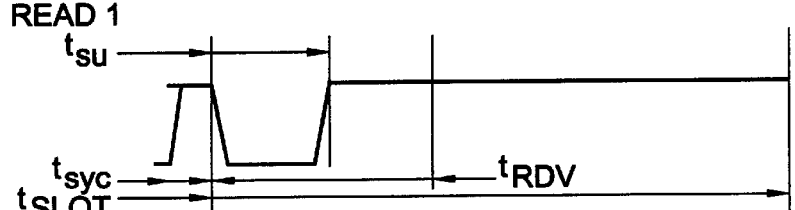
Figure 11D:
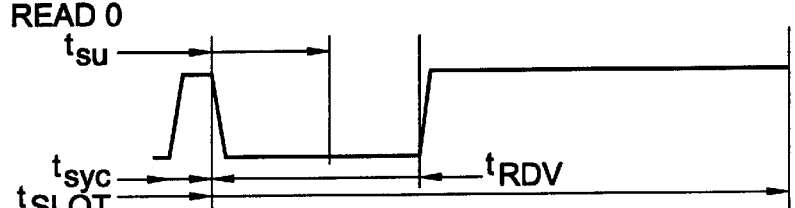

In the "extra bit" and "top bit" cells, illustrated with reference to FIG. 8, the 8 bit DSM schematic, flip flop circuits, and add/subtract logic (see supporting lower level schematics for details, illustrated in FIGS. 9 and 10) are combined to perform the summing node and integrator functions of FIG. 8 in a digital fashion.

The quantizer is realized simply by outputting the most significant bit of the second integrator output. Thus, if the signal is greater than ½ the maximum digital integrator output the bitstream output is a 1 and if the signal is less than ½ of the maximum digital integrated output the bitstream output is a 0.

Thus, the present invention provides a digital to analog conversion without the use of any analog components since the filtered version of the bitstream output is analog in nature.

Also in the telephone ASIC, different digital values (tones) are multiplexed to this circuit thus reducing the overall required pin count on the ASIC. DTMF enable selects to square wave tones (HG and LG) which are encoded into four 8 bit values representing the four logic possibilities of the HG and LG inputs. Eight bits of the voice synthesis circuit output are also available for selection, thus providing a single bit output for voice synthesis rather than the current 8 bits.

b) HIGH SPEED ONE-WIRE COMMUNICATIONS CONTROLLER

A one wire, high speed, bidirectional port is provided on the ASIC at pin 80. This port facilitates serial communication up to 115 Kbits/sec. It is used to provide one-wire communications with option board assemblies, future option board assemblies, the resident electronic serial number device, the add-on Firmware Security Module interconnect, as well as high-speed communication to future Smart Bezels and other customer ASIC feature enhancement circuits. The Smart Bezel interconnect port is also used to facilitate high-speed local serial downloading of phone firmware using a battery-powered handheld downloader. In addition, the circuit is compatible with Dallas Semiconductor products implementing a slower speed one-wire communication protocol. This feature allows many unique Dallas Semiconductor products to be readily interfaced to this system.

The serial interface circuit 12 simplifies serial communications with both existing serial devices using the Dallas one-wire protocol and new ASIC circuits. This circuit implements the master end of the protocol. The hardware provides maskable interrupt generation and several read only/write only registers to interface with the microcontroller firmware. These registers consist of SER_TRAN_BUF, SER_MODE, SER_REC_BUF, and SER_CONTROL. The one wire serial bus interface pin TxRx, see FIG. 2B, is an open collector and requires an external 5kΩ pullup resistor for normal operation.

The serial port interrupt can be masked via the INT_MASK register (address $0023). Even if the interrupt has been masked, the current state of the serial interrupt can be read with the INT_POLL register (address $0024).

Since the protocol operates with only one wire, it is inherently half duplex. All that is required to transmit a byte with the serial circuit is to write the desired value into the SER_TRANS_BUF register (address ($0015). The end of transmission can be determined by either polling the serial port interrupt bit in the INT_POLL register or enabling the serial port interrupt in the INT_MASK register. Once transmission is complete the transmitted value can be compared with the value read from the SER_REC_BUF register (address $0017) for a check of transmission quality. Reading from the serial bus requires loading the SER_TRANS_BUF register with $FF and then reading the received value from the SER_REC_BUF register after transmission is complete.

As noted above, the serial port can operate with existing serial devices that use the Dallas Semiconductor one-wire protocol or new ASIC circuits through a higher speed enhancement to the protocol. The speed of transmission is controlled with the SER_CONTROL register (address $0019) bits 0 and 1. The default value of "00" provides the highest speed operation for use only the other ASICs. All other values provide slower speeds (see table below) with the value '11' providing timings compatible with the Dallas version of the protocol. Bit 3 of the SER_CONTROL register allows the serial interface to operate in a transmit only application. An interrupt is generated any time the transmit buffer empties to signal the end of a transmission or reception. With bit 3 of the SER_CONTROL register set a read of the SER_REC_BUF register is required to clear the serial interrupt and begin the next transmission. This allows consecutive writes to be executed on the serial bus without the overhead associated with the normal read then write cycle.

| SER_CONTROL bit 1 | SER_CONTROL bit 0 | Bit rate with PH2 clock = 894 kHz |
|---|---|---|
| 0 | 0 | 112,324 bps |
| 0 | 1 | 56,176 bps |
| 1 | 0 | 28,088 bps |
| 1 | 1 | 14,044 bps |

The SER_MODE register (address $0016) provides a way to modify the way the two bit states (0,1) are transmitted during each bit times as defined in the protocol specification. Normally, the SER_MODE register will contain all zeros and each bit time will begin with a short low going pulse followed by the bit state for the rest of the bit time and then followed with a period where the line stays in a high state. However, reset, as defined in the protocol, requires that the bus be held low for an extended period of time. This capability is provided by the SER_MODE register. When the hexadecimal value 'FF' is written to this register the TxRx line follows the state of each bit for the entire bit time with the ideal state equal to the last bit value output. The SER_CHECK_BUF register (address $0018) provides a limited means of checking serial port operation. The value read from this register at the completion of a transmission should be the same value that was stored in the SER_MODE register before the transmission.

The protocol used is that of the Dallas Semiconductor one-wire protocol. It is intended that the present invention include embodiments that "co-exist" with Dallas parts utilizing the same protocol. For this reason the instruction set for the serial interface described will be a super set of the Dallas protocol.

Protocol Description

The Dallas one-wire protocol is a robust (yet simple) protocol which allows bidirectional communication between a master and one or more slaves. The ASIC will operate as a master and other devices will operate as slaves as needed. The ability to communicate on a single wire to many devices, both reading and writing, is accomplished by observing predetermined timing and protocol constraints.

Timing Constraints

Timing constraints which are required to maintain compatibility with Dallas parts are shown in the timing diagrams of FIGS. 11A–11D and Table 1, which follows. ASIC timing for a 3.58 MHz system clock is also included in the table.

A Logic "1" is written to a device by first bringing the output low for a minimum of 1 $\mu$sec and a max of 15 $\mu$sec before bringing the line high.

A Logic "0" is written to a device by first bringing the output low for a minimum of 60 $\mu$sec and a max of 120 $\mu$sec before bringing it high for a minimum of 1 $\mu$sec.

A Logic "0" is read from a device by first bringing the output low for a minimum of 1 $\mu$sec and a max of 15 $\mu$sec.

A Logic "1" is read from a device by first bringing the output low for a minimum of 1 μsec and a max of 15 μsec.

TABLE 1

Serial Port
Read/Write Timing Constraints

|  | Dallas MIN | ASIC | Dallas MAX |
|---|---|---|---|
| $t_{LOW1}$ | 1 μsec | 9 μsec | 15 μsec |
| $t_{LOW0}$ | 60 μsec | 63 μsec | 120 μsec |
| $t_{SYC}$ | 1 μsec | 9 μsec | 120 μsec |
| $t_{RDV}$ | 1 μsec | 5 μsec | 15 μsec |
| $t_{SLOT}$ | 60 μsec | 72 μsec | 120 μsec |

Figure 12:
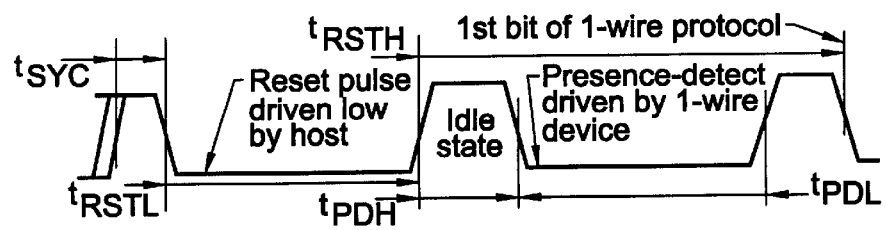
FIG. 12 illustrates a timing signal waveform useful in synchronizing devices in a one-wire communication.

In addition to the timing constraints for reading and writing a bit, there is an additional signaling waveform that is required. This is the reset waveform. This data pattern is used to synchronize all of the devices on the one-wire communication line. The timing of this reset sequence is shown in FIG. 12.

TABLE 2

Serial Port
Reset Timing Constraints

|  | Dallas MIN | ASIC | Dallas MAX |
|---|---|---|---|
| $t_{RSTH}$ | 480 μsec | 504 μsec* | |
| $t_{RSTL}$ | 480 μsec | 504 μsec* | |
| $t_{SYC}$ | 1 μsec | 9 μsec | |
| $t_{PDH}$ | 15 μsec | Determined by slave | 60 μsec |
| $t_{PDL}$ | 60 μsec | Determined by slave | 240 μsec |

Must be in Level mode

Hardware Configuration

Aside from the timing constraints noted above there are additional voltage signaling constraints. Due to the single shared wire nature of the protocol, signaling on both the master and slave must be performed using "open-drain" outputs with passive pull-ups.

Figure 13:
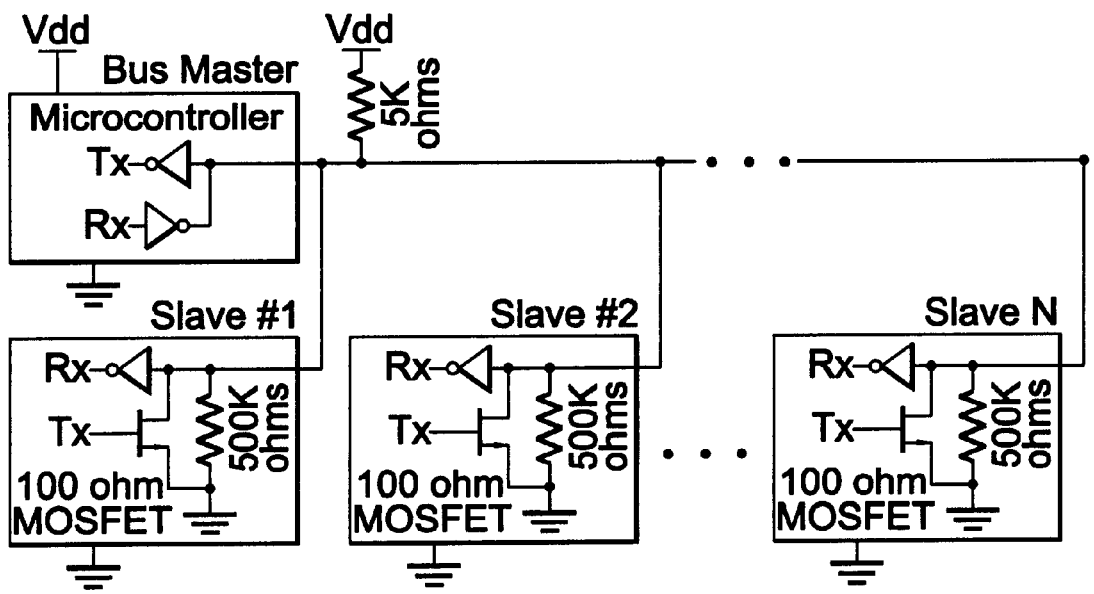
FIG. 13 is a schematic diagram illustrating a system interface configuration, by way of example.

A single 5K ohm pull-up is provided on the common input/output line of the "one-wire" protocol. Secondly each of the slave devices contains a single 500K ohm pull down resistive element. FIG. 13 illustrates one preferred system configuration. Slave devices may be either Dallas "one-wire" protocol devices or ASIC's which incorporate this interface.

Transaction Protocol

As with all communication schemes, the one-wire protocol has a prescribed sequence for all bus transactions. The one-wire protocol has six phases in its transaction sequence:

Reset

Presence Detect

One-Wire Bus Command

Device Specific Command

Data Transaction

Error Checking

Figure 14:
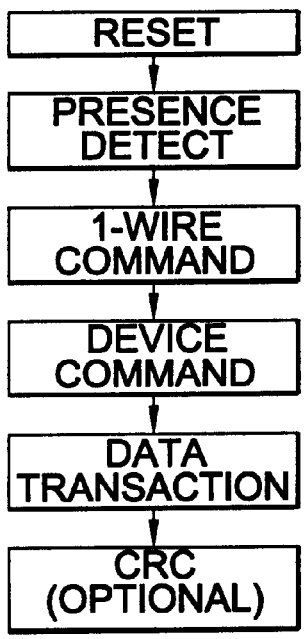
FIG. 14 is a block diagram illustrating a transaction sequence.

Each step is described in detail in the following paragraphs. A flow diagram of the transaction sequence may be found in FIG. 14.

Reset/Presence Detect

All transactions on the one-wire bus begin with a reset sequence, ensuring all slave devices are in the listening mode. The reset sequence is initiated by the master. The sequence is started by holding the bus low for 480 μsec. The bus master then allows the bus to return high for the 480 μsec presence detect signal.

Upon the rising edge, all slave devices come out of reset. They then wait 15 μsec minimum from the rising edge to issue a presence detect, a low going pulse that lasts a minimum of 60 μsec. This response to a reset lets the bus master know that a one-wire device is on the bus and is ready to operate. The presence detect helps the bus master to discriminate communication signals from noise as devices are taken on and off the bus. Refer to the presence detect timing on the previous page.

After all the slave devices have responded to the reset pulse with a presence detect, the bus master drives the bus to an Idle state for a minimum of 1 μsec. This 1 μsec signal is like a frame sync pulse. After each bit is transmitted on the bus this frame sync pulse sets up the bus for the next transmission.

One-Wire Command Word

Once the bus master has detected the presence of a slave device on the bus, it issues one of four one-wire bus commands. These commands either select the appropriate slave device or query the bus for ID numbers. All one-wire commands are eight bits long. These commands are as follows:

CCh Pass Thru Mode—This time-saving command allows the bus master to access the slave device directly, without first specifying it by its 48-bit ID number. This command can only be supported with a single slave device on the bus. If more than one device is on the bus when this command is issued then all devices on the bus will respond simultaneously and cause bus contention.

33h Read ROM Data—This command allows the bus master to read the family code, unique 48-bit ID number and CRC that is stored in the slave device ROM. Like the Pass Thru Mode command, this command can be used on if it is the only device on the bus. If more than one device is present then there will be bus contention.

55h Match ROM Data—This command allows the bus master to single out a specific slave device among many on the bus. The master selects a specific slave device by issuing this command followed y its 4-bit ID number for the transaction. All 64-bits of the ROM must match for a valid transaction. This command can be used with a single or with multiple devices on the bus.

F0h ROM Search Data—When a system is being initially brought u, the bus master might not know the number of types of devices on the bus. By invoking the Search ROM Data command the bus master can, by a process of elimination, find out the ID numbers of all the devices on the bus. Once this is known, the bus master can then go back and read the device type that corresponds to each ID number.

The ROM search process is the repetition of a simple, three-step routine: read a bit, read the compliment of the same bit, them write the desired value of that bit. This process is performed on each bit of the device ROM. After one complete pass, the bus master knows the contents of the ROM in one device. The bus is reset and the process is repeated again, selecting a different set of values. The bus master controls the search by what values are written as select bits.

AXh Single Drop Mode—This command is issued to put all Dallas devices on the bus to sleep and signal one of 16 single drop ASIC's to set up for data transfer. The Dallas devices will remain asleep until a reset signal is sent to all devices as described above.

The latter four bits of this command select the specific device to be addressed. This greatly simplifies the communication with devices and still allows mutual co-existence with Dallas parts on the same bus. The 16 specific addresses will be assigned during chip development and will be "hard-coded" into the ASIC.

9Xh Multi Drop Mode—This command is identical to the single drop command except that it allows for addressing of multiple devices of the same type to operate on the one-wire bus. This is accomplished by pre-assigning four two bit addresses for these ASIC's whose lower address bits will be determined by the state of two input pins on the chip. Therefore, together with the AXH command 32 devices may be addressed on the one-wire bus.

Device Command

During this phase of the protocol, the bus master transmits the device specific command. The length of the command word varies with the device type. This allows for different embedded protocols to be used to fit the specific requirements of the device type used. This same approach will be used for ASIC as well.

After the command word is transmitted, data is transferred to or from the slave device, according to the predetermined requirements of the slave device. All reading and writing to the slave device is controlled by the bus master. For information on how the bus master controls the data flow, refer to the following section titled "Data Transmission."

Data Transmission

Data transfer on the one-wire bus is predetermined by the state of the slave device, the type of the slave device, the mode of operation and a specific command word sent to the device. For Dallas parts Data is generally in 64 bit (8 byte) transfers. Either all read or all write. The only exception to this is when operating in the Search ROM Data mode when two bits are read followed by the writing of one bit. As explained this process is repeated over and over until the ROM address and CRC information has been obtained.

For custom devices the process is similar except that each time the chip is addressed four bytes are written and four bytes are read from each device. Only a reset sequence will alter the predetermined read/write sequencing of any device on the one-wire bus.

The transfer of data on the one-wire bus is time dependent. Each bit is individually transferred across the bus in a specific amount of time, referred to as a time slot. A time slot is typically 60 $\mu$sec long but can be as long as 120 $\mu$sec and is the same independent of bit value. Therefore the time to send a 1 is the same as a 0. The time slot length is set by the master.

For the bus master to write a bit on the one-wire bus, it pulls the bus low for a minimum of 1 $\mu$sec. The low going edge informs the slave devices that a bit is being sent. After 1 $\mu$sec, the master does one of two things:

1) holds the line low for an additional 58 $\mu$sec to output a 0 (write a 0) or,
2) lets the bus go high for an additional 59 $\mu$sec (write a 1).

The state of the bus during the 60 $\mu$sec time phase determines the value of the bit. All slave devices will sense any rising edge during his 60 $\mu$sec time phase as a 1. After the 60 $\mu$sec has lapsed, the bus master must then drive the bus high for 1 $\mu$sec. (This is the frame sync mentioned earlier.) This process is repeated until all eight bits are transmitted. Refer to the timing diagrams of FIGS. 11A–11D.

The read cycle on the one-wire bus is very similar to the write cycle. It is started with the bus master pulling the bus low for 1 $\mu$sec. This informs the slave device sending data that it should have data on the bus no later than 1 $\mu$sec from the falling edge. After 1 $\mu$sec, the bus master lets go of the bus and lets the slave drive it. The slave must hole the data for an additional 15 $\mu$sec. During this slave holding time, the bus master reads the state of the bus. (Refer to timing diagrams of FIGS. 11A–11D.) Ideally, the bus master should read the data within 15 $\mu$sec of the falling edge. The entire cycle time for each bit lasts a minimum or 60 $\mu$sec (120 $\mu$sec max) from the falling edge. At the end of the cycle, the bus master drives the bus high for 1 $\mu$sec. Again this is the frame sync for the next bit. This sequence is repeated until all of the data is transferred or the bus is reset.

Circuit Description

Master—top level (serial_port cell)

Figure 15:
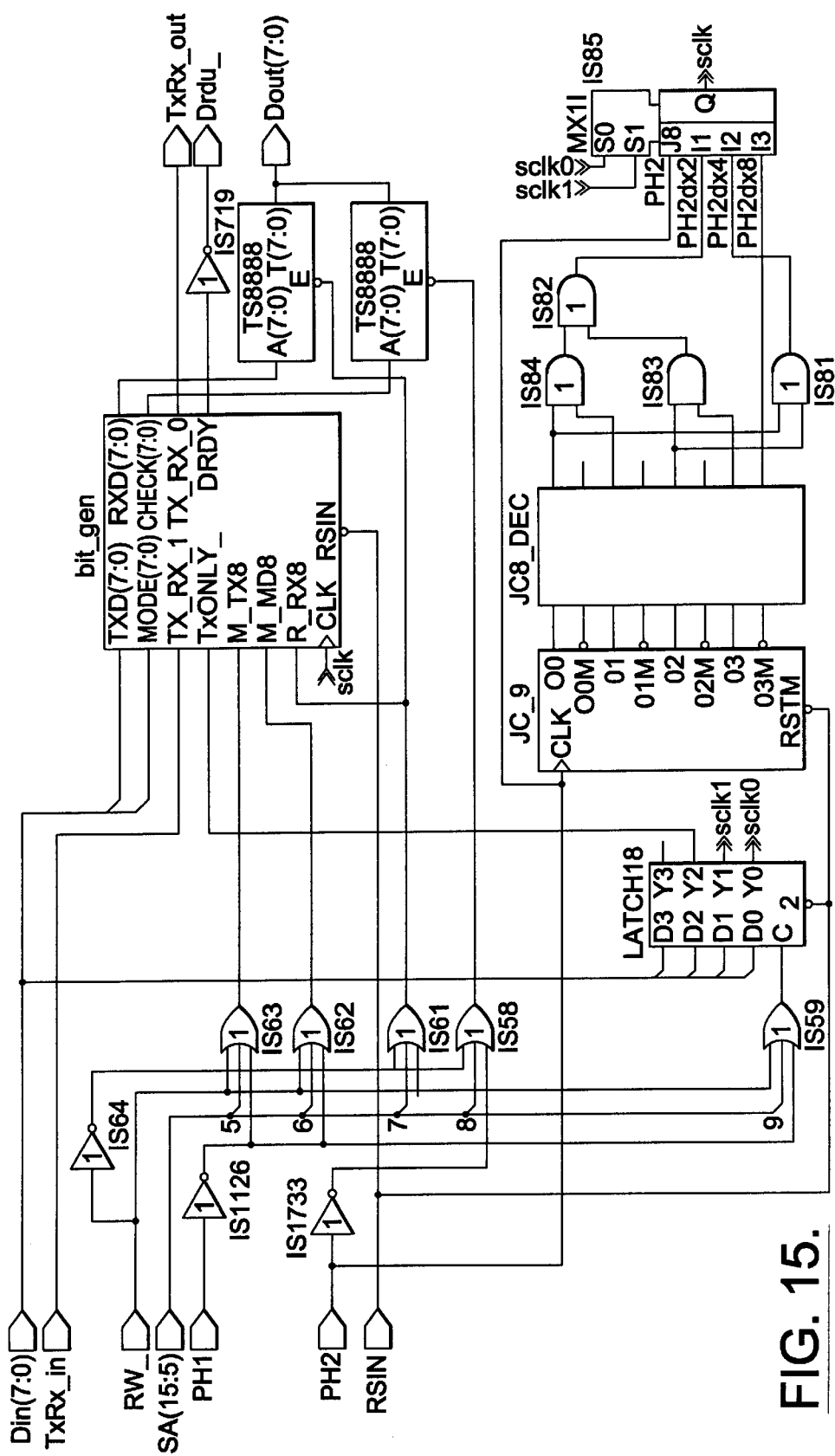
FIGS. 15 and 16 are schematic diagrams illustrating an implementation of a serial interface useful with the intelligent pay telephone of the present invention.
Figure 16A:
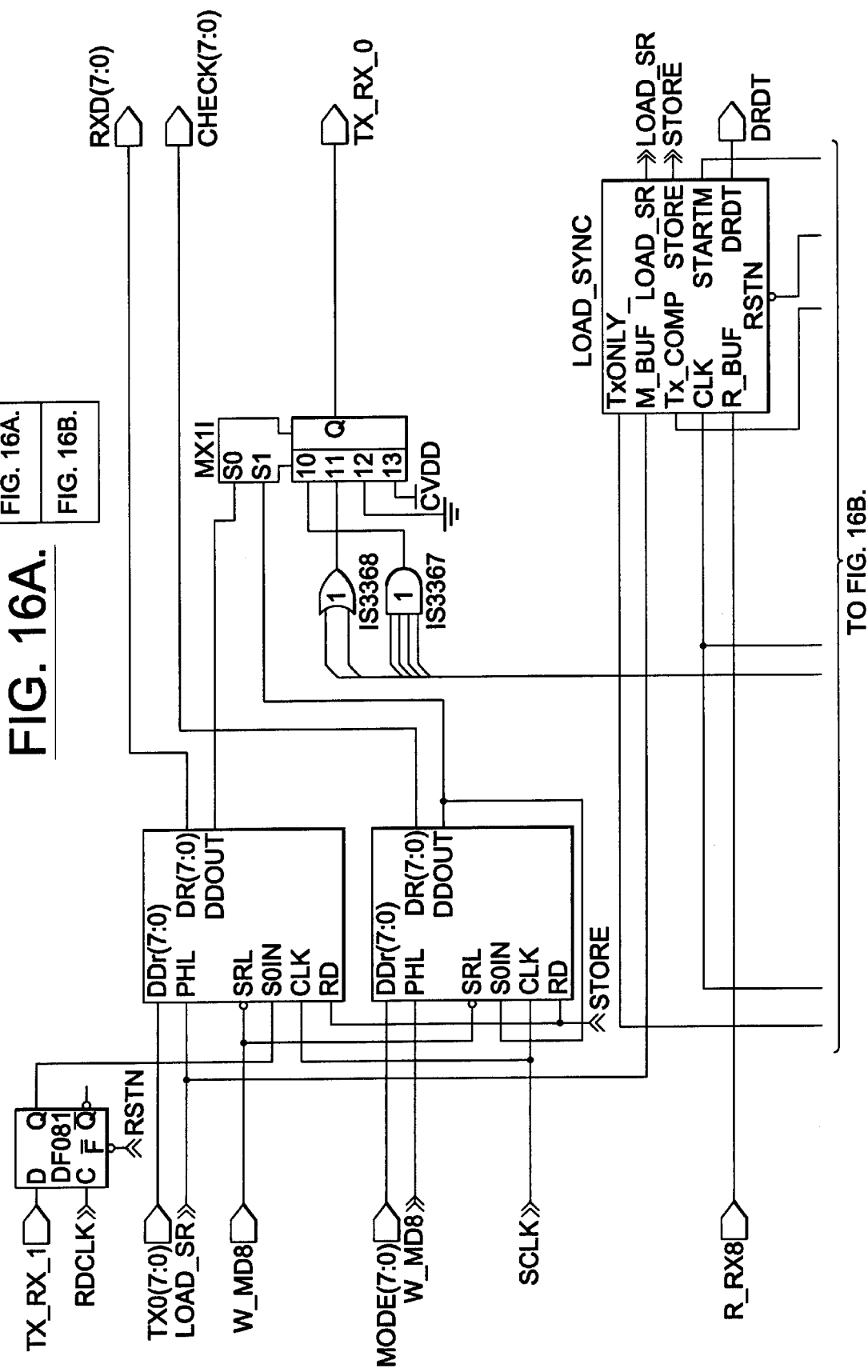
Figure 16B:
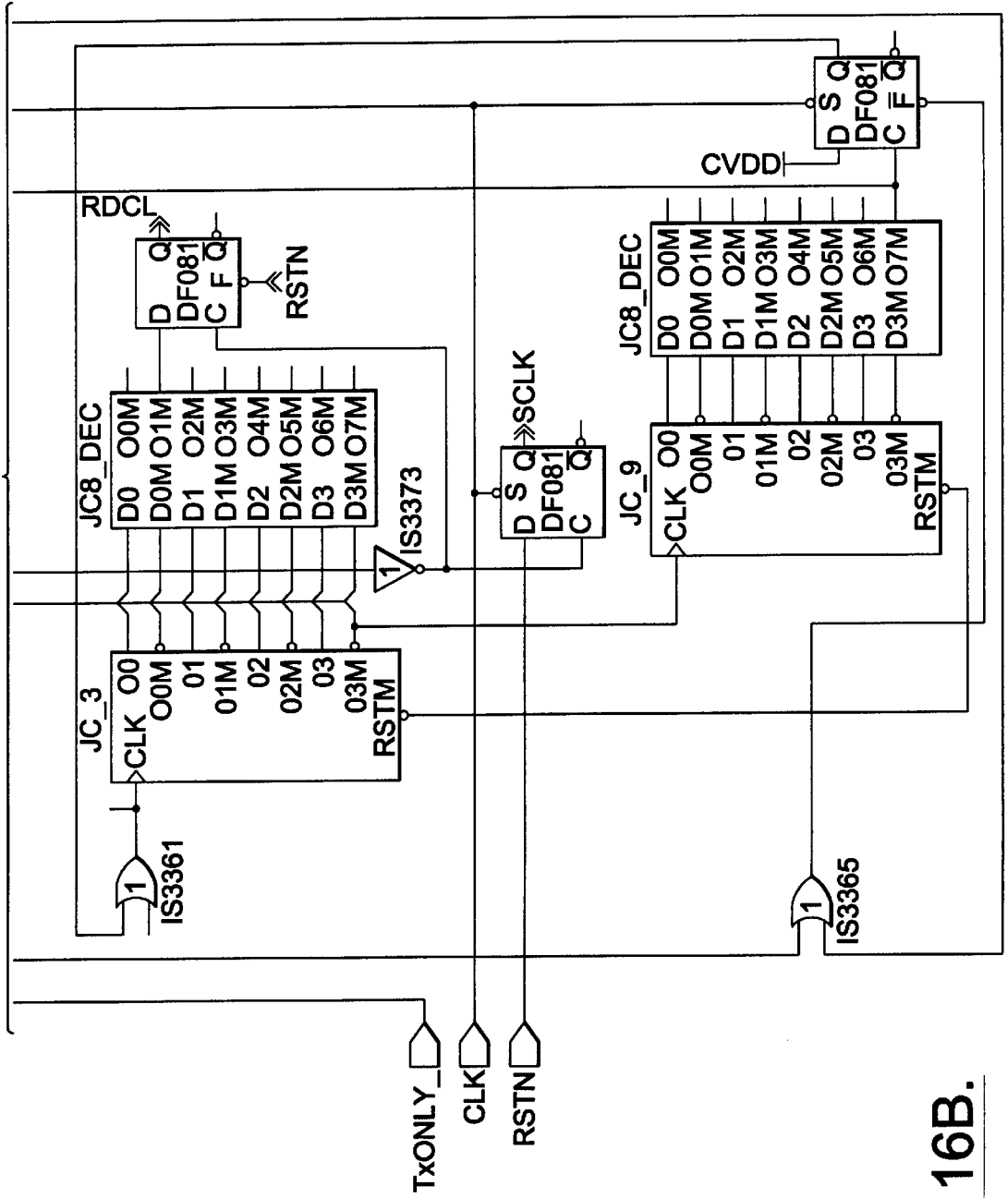

The circuits for the 1-bit master implemented in the ASIC are illustrated with reference to FIGS. 15 and 16. The circuits may be found attached to the end of this document. Reference will be made to these diagrams to aid in the circuit description of operation.

The top level schematic consists of a block called bit_gen which takes on all the timing talks of generating the appropriate bit patterns for reading and writing 1's and 0's. The rest of the circuitry on the top level is to interface the Dallas master bus circuit (bit_gen) to the existing 45A ASIC. This includes the mapping of its registers into the present phone I/O address and interrupt scheme. Specifically the following address maps have been implemented.

| I/O Address | Bit Mapping | | | Description | |
|---|---|---|---|---|---|
| New Register Assignments: | | | | | |
| 015h (Write) | [TxD$_7$ TxD$_6$ TxD$_5$ TxD$_4$ TxD$_3$ TxD$_2$ TxD$_1$ TxD$_0$] | | | Transmit Buffer Register | |
| 016h (Write) | [Mode$_7$ M.$._6$ M.$._6$ M.$._6$ M.$._6$ M.$._6$ M.$._6$ M.$._6$] | | | Mode Buffer Register | |
| 017h (Read) | [RxD$_7$ RxD$_6$ RxD$_5$ RxD$_4$ RxD$_3$ RxD$_2$ RxD$_1$ RxD$_0$] | | | Receive Buffer Register | |
| 018h (Read) | [Check$_7$ C.$._6$ C.$._5$ C.$._4$ C.$._3$ C.$._2$ C.$._1$ C.$._0$] | | | Check Buffer Register | |
| 019h (Write) | [n/a n/a n/a n/a test xmit$_{ONLY}$ CLK$_1$ CLK$_0$] | | | Misc Control Register | |
| Modifications to Existing Register Assignments: | | | | | |
| 023h (Write) | [Voice Smart Modem DTMF DRDY | Loop | Coin Kbd] | Interrupt Control Register | |
| | [Synth Beze! | Cur. | Det. | | |
| | [NMI NMI NMI NMI IRQ IRQ*1 | IRQ | IRQ] | | |
| 024h (Read) Register | [Voice Smart Modem DTMF DRDY | Loop | Coin Kbd] | Interrupt Poll | |
| | [Synth Bezel | Cur. | Det. | | |
| | [Poll Poll Poll Poll Poll Poll | Poll | Poll] | | |

The data ready status of the master circuit has been added to $bit_3$ of the interrupt poll register {024h} and to the DRDY IRQ which may be masked out by setting $bit_3$ of the interrupt control register {023h}. A low in this bit position signals a Data Ready Condition.

Register Description

Transmit Buffer Register—This register is a write only register for storing buffered data to the 1-bit master bus circuit. Data may be written during a current transmission or after. If it is written after a byte transmit has been completed when in TxOnly mode ( or after previous transmitted data has been read) the data will load immediately into the data shift register and begin transmission of a new byte. If the data is loaded into the transmit buffer while the previous data is being transmitted then the new data will not be loaded into the data shift register until the present data has all been transmitted[1]. Bits in this register are set to a 1 for operations that require a 1 to be transmitted or any read operation.

Mode Buffer Register—The mode buffer register allows bits to be sent as one-wire bit wave-shaping or as a fixed high or fixed low (LEVEL MODE) for the entire bit period. This not only allows for a simple way to generate reset sequences but also allows for async data to be sent which can be read by a properly configured UART. The mode may also be written during or after a byte transmission but differs from the transmit register in that a transmission will not wait on a write to the mode register. This allows for the register to be changed only when a reset is required. Note: When operating in the LEVEL MODE the data is returned to the value of the first bit in the data register. This allows the maximum width pulse to be generated with only 8 bits.

Receive Buffer Register—The receive buffer register is used to read data received from slave devices. A full byte of data ready to read is signaled by the DRDY signal. This signal sets the Interrupt Poll register $bit_3$ and generates an interrupt if the $bit_3$ mask is not set in the interrupt control register. The previous receive data byte may be read during data transfer operations of after. A new transmission will not begin until this register is read[1]. This may be overridden by setting the $Xmit_{only}$ $bit_2$ to a '0' in the misc control register described below.

NOTE: One half a clock cycle is required from the DRDY_going low to the writing of the Xmit buffer. If code execution is fast enough for this condition to occur then a software delay must be provided.

Check Register—The check register is provided as an extra feature to verify whether the data transmitted out is what was sent to the transmit register. This register may be used in leu of a CRC check but must be performed on a byte basis rather that a transaction basis. The check register is valid as soon as data ready becomes active. Data ready is not cleared by check and there is no semaphore control on this register; therefore it is recommended that the read of the check register be performed either just before or just after reading the receive register.

Miscellaneous Control Register—this register has been created to provide a common point for various single bit control and configuration signals. Three of these bits have been allocated for the serial port bus master circuit. $Bit_0$ and $bit_1$ have been allocated to allow programming of the one-wire but clock speed. With these bits both set to 0 the timing will meet all of the requirements of the Dallas protocol as defined in this document. For higher speed of operation in circuits, higher clocks may be obtained by setting the two clock bits according to Table 3 below. Since the bus control circuit is set up to prevent new data from corrupting the read register if it has not been written to, a control bit, $bit_2$, of this register has been provided. Bit2 of this register is used to prevent the data ready flag DRDY from inhibiting a new transmission when only transmit data is required.

TABLE 3

Bit mapping of the Misc Control Register
Clock Control Bits

| Misc Control Register $B_1$ | Misc Control Register $B_0$ | Bit Rate* |
|---|---|---|
| 1 | 1 | 14,044 bits per second |
| 1 | 0 | 28,088 bits per second |
| 0 | 1 | 56,176 bits per second |
| 0 | 0 | 112,324 bits per second |

*Based on 3.58 Mhz Processor Clock (C6502 core)

Master—(bit_gen cell)

The bit_gen cell is comprised of five general functions, bit shaping state machine, bit_counting state machine, load and synchronization logic, register logic and miscellaneous control and timing logic.

Example Implementation of the One-Wire Circuit

A unique serial programming method has been developed for the purpose of loading new operating features to the payphone at a rate of approximately 7500 bytes per second. Using a 1200 baud modem, it takes approximately 45 minutes to reprogram the FLASH ROM (read only memory) with new operating code and one language worth of voice. A proprietary one-wire, high-speed, bi-directional port (TxRx) communicating at a rate of up to 115K bits/sec was embedded into the system ASIC for the purpose of providing firmware with the necessary interface to reprogram any part of the FLASH ROM at a rate of about 100 times faster than would have been possible with a 1200 baud modem.

Programmer

Programming the data into the FLASH ROM requires a proprietary interface box, as an example, that is capable of interfacing directly with the ASIC's TxRx via the same connector, JF, on the mother board that is used for the upper housing. The interface box initiates communication when it's switch is turned on, but the phone's microprocessor will work as the master. The interface box works as a slave device where all that it does is to supply one bit of data and increment its binary address pointer for every received clock pulse. The data stored in the interface box is comprised of two major components known as the header and the sector data.

The header provides data addressing and integrity check information.

The sector data is the actual data that will be programmed in the FLASH ROM. Each sector is 16,384 bytes in length.

Mother Board

The mother board begins operating from the boot block sector of the FLASH ROM each time the phone is powered up. A function called by the boot is to detect whether a programmer is present by toggling a port line and looking for an appropriate response. If it is there, then the one wire programming mode will be entered and the appropriate actions will take place where one or more sectors of the FLASH ROM will be programmed using the ASIC's TxRx interface.

c) OPERATING SYSTEM SECURITY KEY

A Firmware Control Key (the "key") provides a means of controlling product firmware releases on a per phone basis for the purpose of promoting software security, implementing unique pay station operation, and to facilitate future firmware or software installation or operation on a per phone basis. To provide for the security required, as well as allowing flexibility in implementation, three parameters will be required. The three parameters include Configuration Code, Product Code, and Revision Level.

The configuration code will be used for two purposes. The first is to match a specific group of firmware to the mother board's DS2502, as illustrated with reference to FIG. 17 or any custom device, as illustrated with reference to FIG. 2B, and the second is to match the same DS2502, or any custom device, to an insertable key at location JS, that will provide the ability for the phone to be either upgraded to a different product configuration or for revision updates. If the configuration code of the mother board is different, then the security key will be ignored and the phone will be limited to operate as defined by the mother board's DS2502.

The product code is used for the purpose of defining what firmware can be used in the phone. This parameter will be used when a vendor gives the right for a particular product to be changed to operate as a different product. The product code in either the mother board's DS2502 or the inserted key MUST match the operating system's product code for the phone to continue running from the operating system. If there is no match, then the phone will operate from the boot code. This number will most likely change whenever features are added, removed, or changed.

The revision level facilitates control of any enhancements made to a specific product. Means for backwards maintainability are also provided. The revision number in either the mother board's DS2502 or the key's DS2502 must be equal or greater than the O.S.'s revision level, otherwise the phone will only be able to operate from the boot code.

Figure 17B:
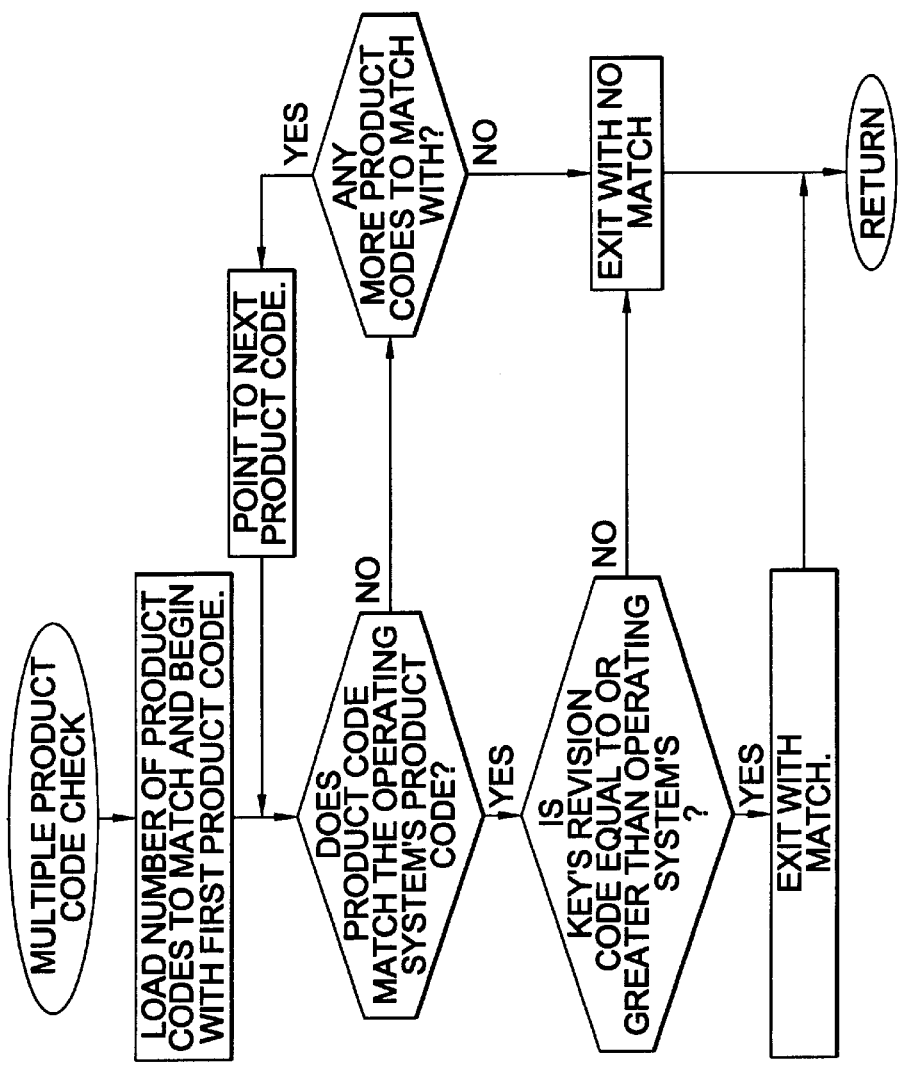
FIG. 17 is a block diagram illustrating an operating system generic key check.
Figure 18:
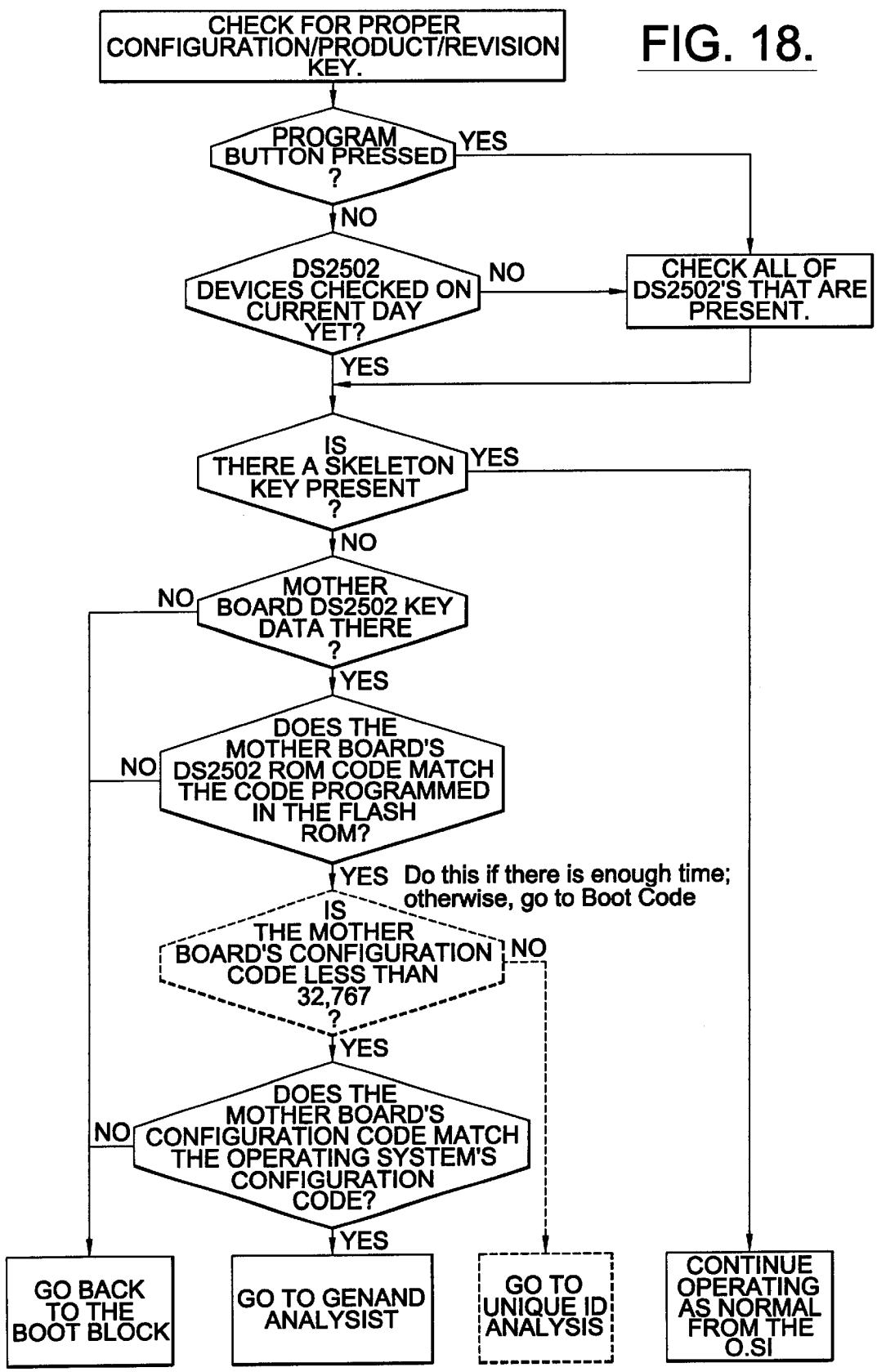
FIG. 18 is a block diagram illustrating an operating system main key check for proper configuration, product, and revision.
Figure 19:
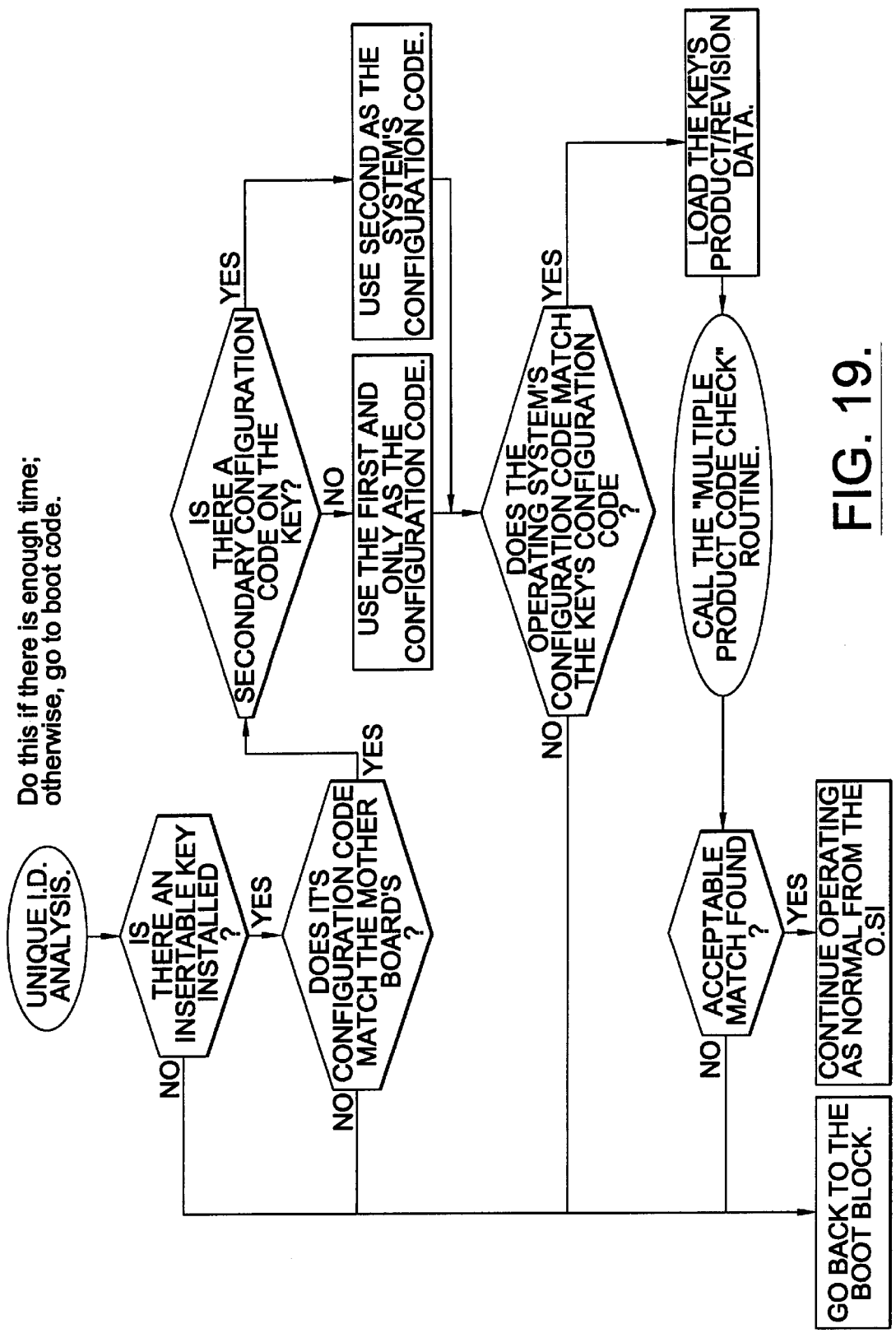
FIG. 19 is a block diagram illustrating an operating system unique key identification check.
Figure 20:
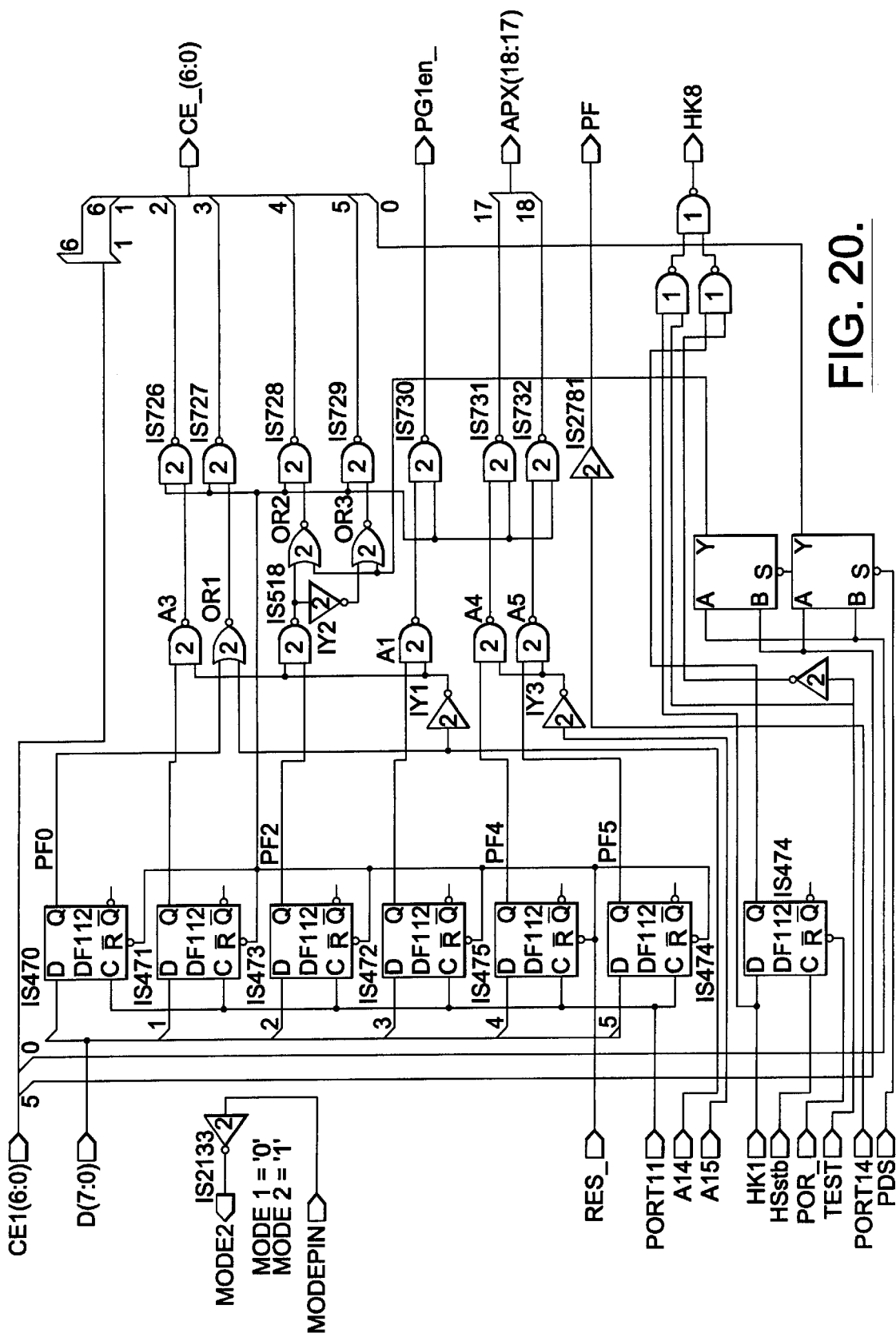
FIGS. 20 and 21 are schematic diagrams illustrating embodiments useful in the intelligent pay telephone of the present invention.
Figure 21D:
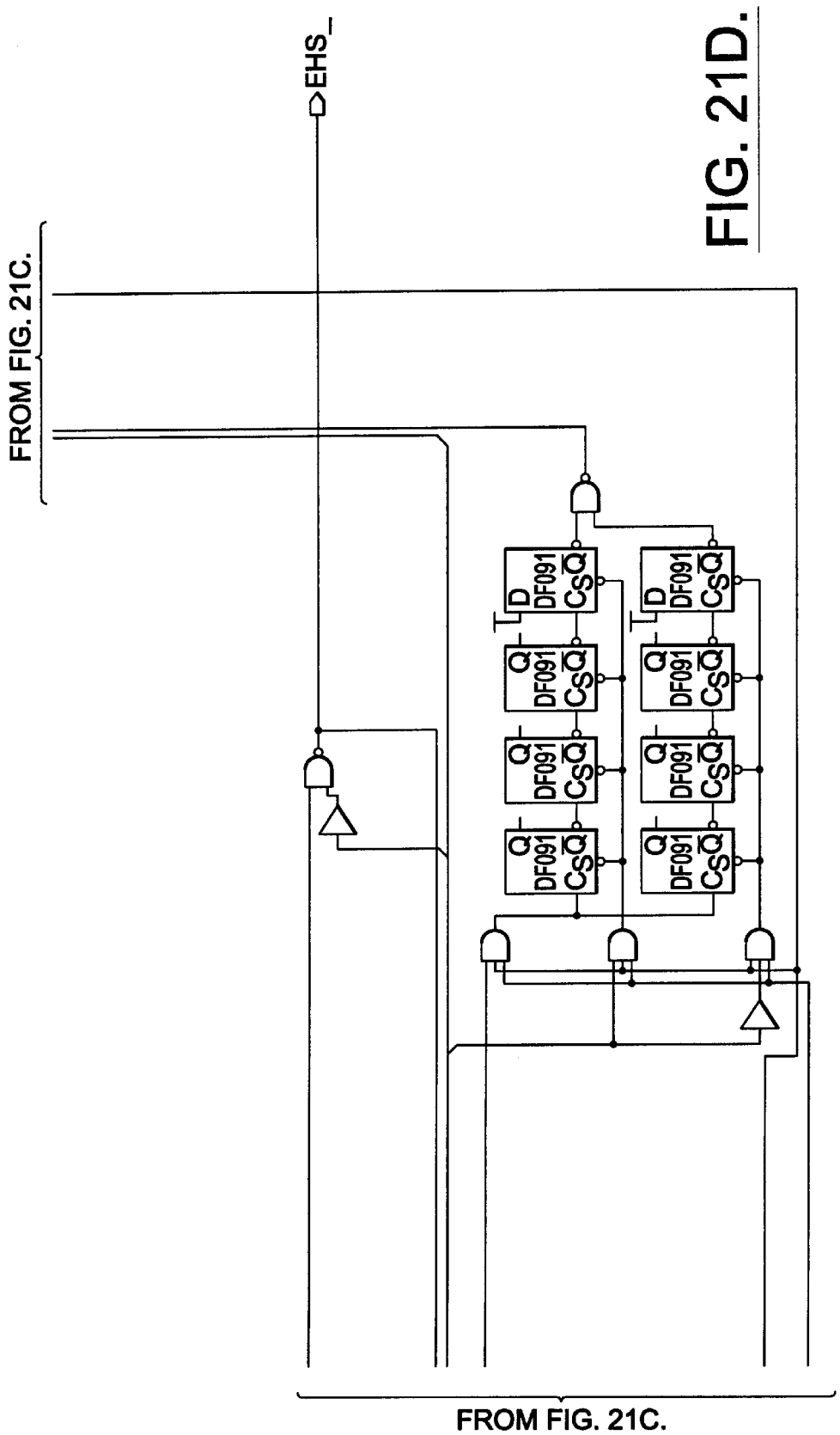
Figure 22:
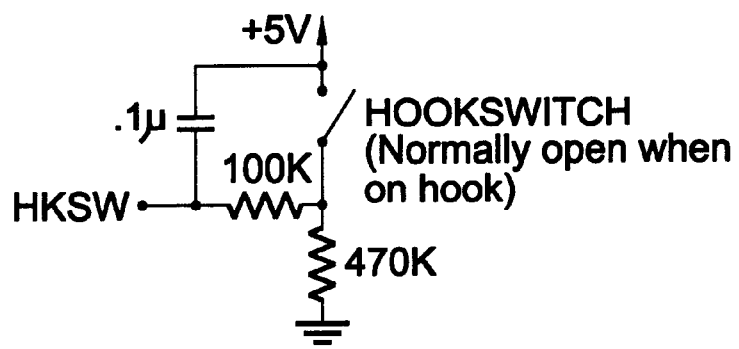
FIGS. 22 and 23 are schematic diagrams illustrating a hookswitch and improved hookswitch embodiment useful in the pay telephone of the present invention.

Flow charts of FIGS. 17, 18, and 19 illustrate, by way of example, a firmware response to various combinations of configuration codes, product codes, and revision levels.

Soft Key Technique

The following is an alternate method of securing, controlling, or restricting the pay station firmware on a per phone basis.

Hardware Basics

A 6-bit register is implemented in a custom integrated circuit. These 6 bits represent 2 to the 6th power unique configurations, or "seeds", i.e. 0 to 63. The device manufacturer (IC supplier) programs this register with one of these seeds. The devices are programmed sequentially such that the process yields equal quantities of each of the different seeds.

In addition, a unique dated-code serial number is programmed into a utility FLASH memory device.

A firmware algorithm creates a soft key based on the ASIC seed and the serial number. This means each phone has a unique (actually dependent on the number of serial number bits used) key which can be used to encrypt any data stored in the phone. The serial number is in a FLASH memory device which means it can be copied or modified, however the seed is in a non-reprogrammable device.

Actual encryption of features to be resident in the phone takes place at a remote service center. If data generated at the phone location were desired to be secured, a second algorithm would encrypt the data using the phones soft key.

Each time a phone is powered up, the firmware checks to see that the soft "KEY" is correct to assure that the unit serial number has not been tampered with.

Applications

Typical applications of the soft key include controlling firmware versions and releases, or to control telephone options. This is achieved by encrypting the firmware control mechanism for the applications with the resident soft key. For example, to control telephone options, the phone's option code register (the control mechanism) is encrypted using the soft key. Reading the option code register is meaningless unless you know a) the phone's serial number, b) the phone's seed value, c) how the algorithm works that generates the soft key from the serial number and the seed, and d) how the algorithm works that encrypts the option code using the soft key. The probability of two phones yielding the identical soft key is a very large number (easily greater than one in many thousand) depending on the exact number of serial number bits used to create the soft key itself.

An automated procedure is used to add new options (or upgrades) to installed phones. A modem connection is established between the phone and a service center either by the phone calling in, or the service center calling the phone. The service center issues a command to read the soft key, the encrypted option code register, and the unit serial number. The service center decrypts the option code register contents, modifies it as requested and approved, re-encrypts the modified option code, and then downloads the updated option code to the phone. This process is fully automated, including receipt of payment for the transaction.

d) HOOKSWITCH

A unique, low input impedance hookswitch detection circuit is integrated into ASIC U4. This circuit works in conjunction with the external C20, R34, R36 components which connect with the JF upper housing interconnect at pins 8 and 20, as illustrated with reference to FIG. 2C. This circuit provides a low impedance input that minimizes the affect of intruding water across the mechanical hookswitch contacts which can otherwise cause false hookswitch action.

Figure 2C:
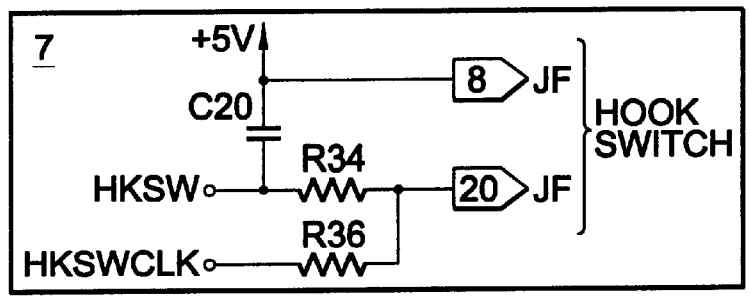
Figure 2D:
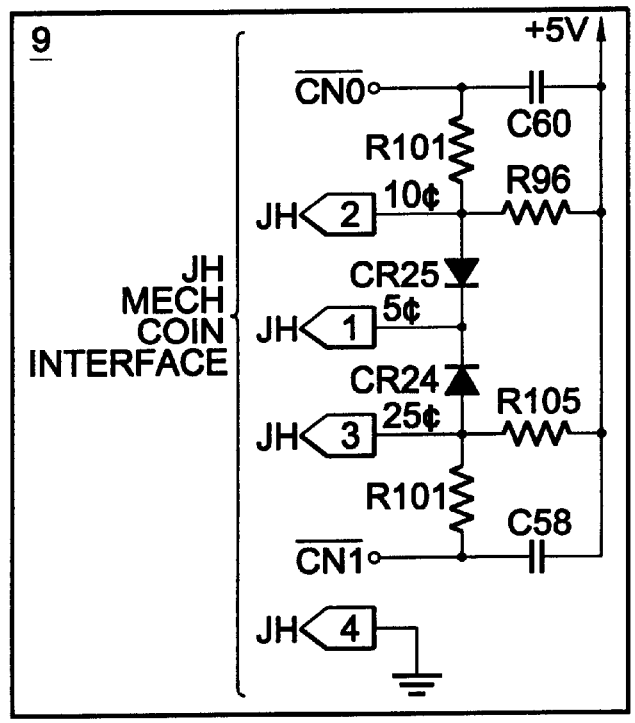
Figure 2E:
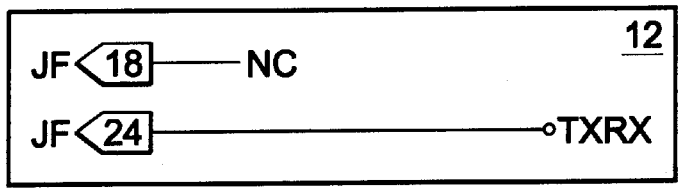

As illustrated with reference again to FIG. 1, hookswitch interface 7, and to FIG. 2C.

A pin is provided on the ASIC which is used for monitoring the condition of a mechanical hookswitch. When this input is low it is assumed that the phone is on-hook. When it is high it is assumed that the phone is off-hook. Leakage across the terminals of the switch in the past has caused false indications of an off-hook condition. The circuit of the present invention is designed to work to leakage levels as low as 10K where as the older circuit started having problems at 100K ohms of leakage impedance.

Another constraint, since the circuit operated while the phone is still on hook, is that the operating current of the detection circuit while on-hook be less that 1 $\mu A$.

Circuit Description

Figure 23:
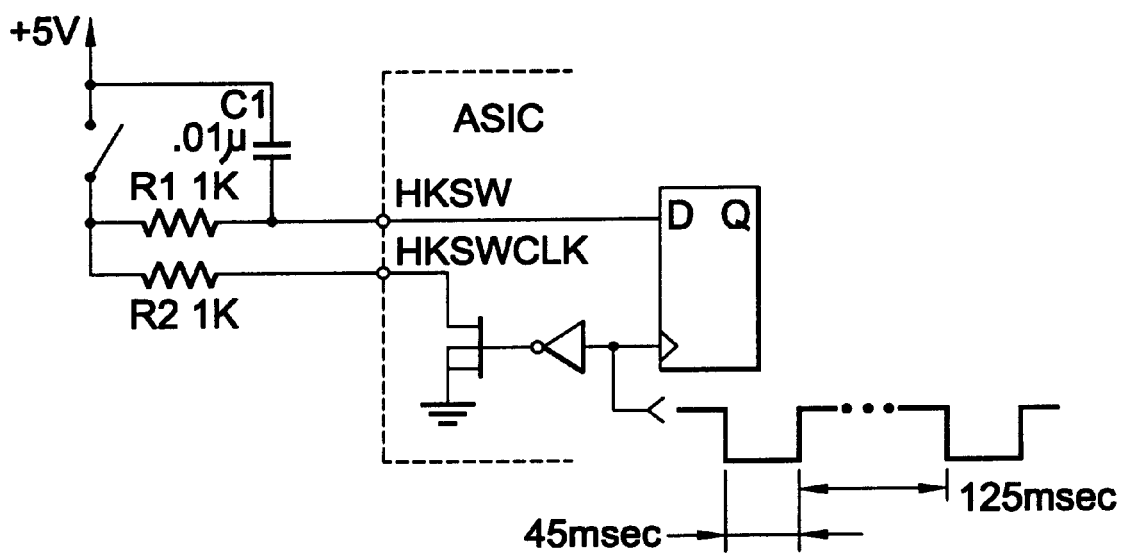
Figure 24A:
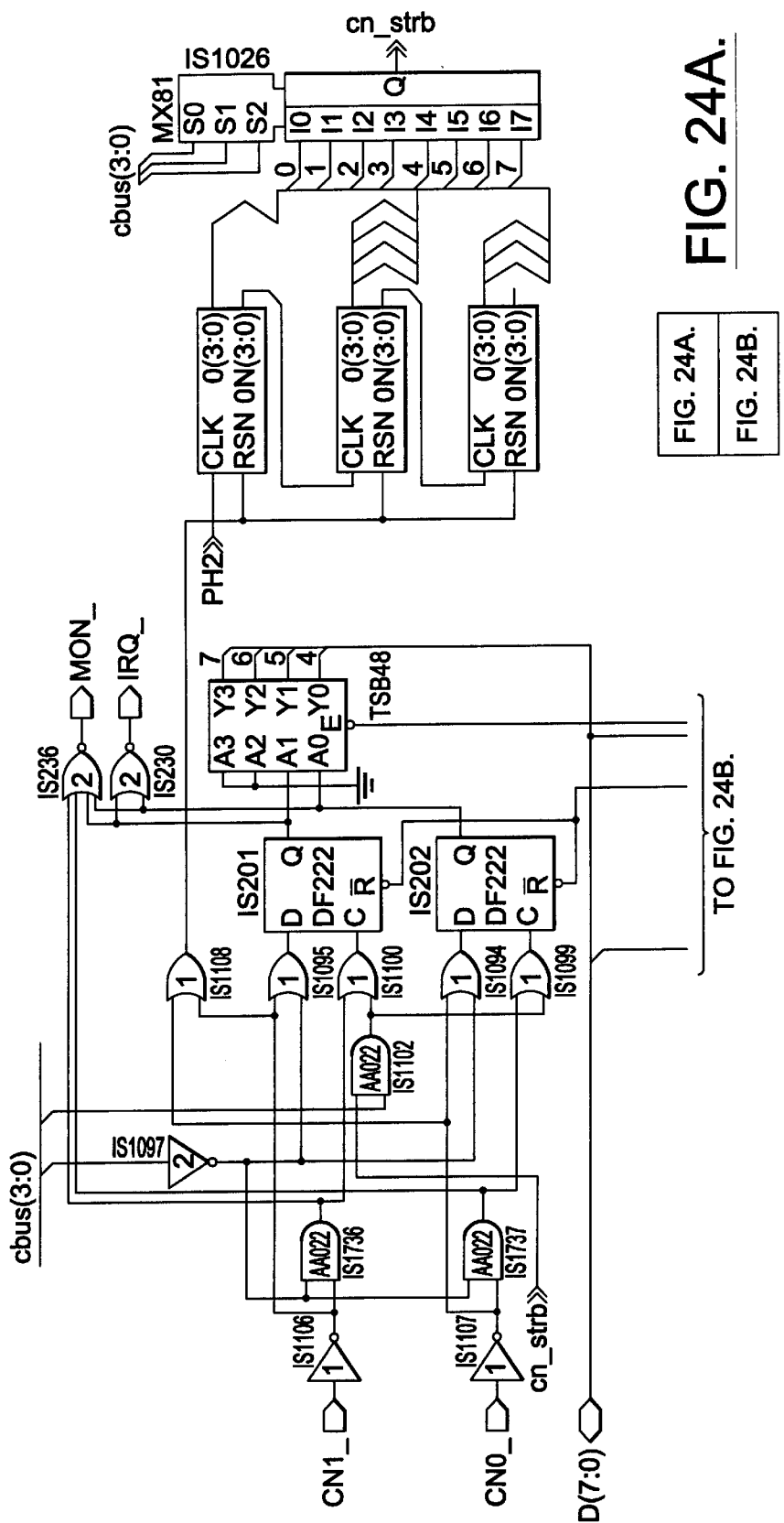
FIG. 24 is a schematic diagram illustrating a coin detection circuit of the present invention.

The circuit of the present invention consists of a single flip flop and open-drain output buffer, incorporated into the ASIC, and an external RC network. This circuit is shown in FIG. 23. This circuit is connected to the external hookswitch as shown, also in FIG. 23.

Circuit Operation

An internal signal is created which provides a low going pulse of width 45 $\mu sec$ and a period of 125 msec. While the pulse is low, the open drain buffer charges capacitor C1 through R1 and R2 resulting in 0 Volts being applied to HKSW and the D input of the signal latch flip-flop. When the controlling signal is high the open drain buffer is turned off and (in the absence of switch leakage) the hookswitch input remains low.

For a leakage of 10K it is required that an on-hook condition still be signaled. Under this condition it would take about 100 $\mu sec$ for the input to reach the 2.5 volt threshold. The signal is strobed in 45 $\mu sec$ thus still assuring that a on-hook condition is still signaled.

When the phone is taken off-hook the switch closes and C1 is discharged through R1 and forces the HKSW input high—signaling the desired off-hook condition.

The max current under worst case leakage is about 500 μA with a duty signal of 0.036% this results in a average current of less than 0.2 μA, an order of magnitude less that the 2 μA required by today's circuit. With the phone off hook peak current is about 5 mA resulting an average current of about 2 μA equal to the 2 μA required by today's circuit.

e) Programmable Coin Detection

Figure 26:
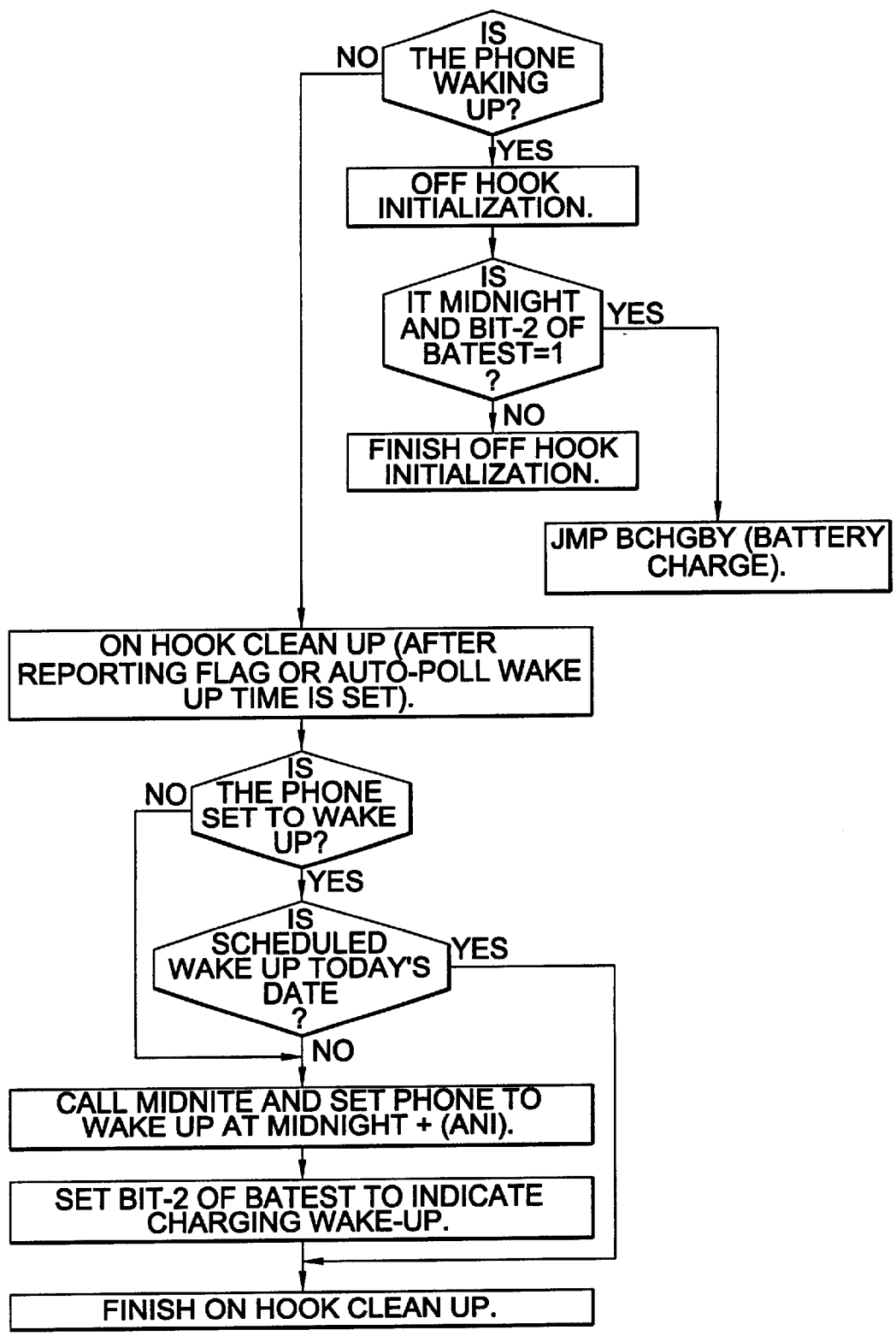
FIG. 26 is a block diagram illustrating an automatic battery charge process of the present invention.

Two coin sense leads are input to the ASIC. The two inputs 95 and 96 are designed to represent the nickel and dime with the quarter activating both inputs via external circuitry, as illustrated with reference to FIG. 2F. Of course, actual interpretation of the bits is the firmware's responsibility. Both inputs are schmitt-trigger buffered normally pulled high. Any coin input is latched. The coin latches are readable via zero page memory-mapped I/O (COIN_RING register, address $002C). The outputs of the latches are ORed generating a single coin interrupt (IRQ) to the processor via the interrupt control circuit. Reading the outputs of the coin latches clears the latched coin o input and the coin interrupt. Reference is made to FIGS. 1, 2B, and 26.

The buffered coin inputs to the ASIC are ORed providing a monitor input to the processor via the interrupt control circuit. The ORed interrupt signal and the ORed monitor signal are also ORed to generate the actual input to the interrupt poll register. This allows for coin debounce in software. Programmable hardware debounce is also available via the DEVLOCK register (address $0106, bits 0–3). Setting the coin pulse control bit (bit 3) enables the debounce hardware. The desired value of debounce time is programmed into the coin pulse bits (bits 0–2). The debounce time is then given by TIME=8*2^(VALUE) *1/(PH2 freq.), or approximately 18 μsec to 125 msec.

The coin circuit can be disabled by holding the coin enable bit of the HDW_CNTRL1 register (address $0025) reset. Likewise, to activate the coin detection circuit, the coin enable bit of the HDW_CNTRL1 register must be set.

f) Secured Memory Page Swapping

A unique memory-mapping circuit is designed into ASIC U4 which provides a page swapping technique for the purpose of expanding the microprocessor's 64 kbyte direct address range. This memory-mapping technique allows access to large blocks of memory and includes multiple password registers for the purpose of providing robustness to potential memory corruption as a result of lost code execution.

One important function the MPP ASIC provides is to extend the 64k address space of the ICD0000040 microprocessor, or CDM 65SC151 microprocessor. This is accomplished by extending the address bus width to 20 bits and providing 4 chip selects for physical memory devices. Therefore the maximum addressable memory in a fully configured system would be 4 Mbytes (four 1 Mbyte devices).

The four chip selects are categorized as either primary or auxiliary and either ROM or RAM. Chip select RAMCE* is for primary RAM, ROMCE* is for primary ROM, XRAMCE* is for auxiliary RAM, and XROMCE* is for auxiliary ROM. A minimal system would be composed of two external memory devices controlled by RAMCE* and ROMCE*. Note that the device controlled with ROMCE* need not be a read only memory but could be a EEPROM, FLASH EPROM, or some other rewriteable device. The distinction is that the device connected to ROMCE* is where the utility program would reside.

Each device's physical address space is divided into 16 kbyte blocks by the extended address bus lines A14PY, A15PY, A16PY, A17PY, A18PY, and A19PY (see Table N1). Any 16 kbyte block from any of the four memory devices can be mapped into one of the four blocks of microprocessor address space (see Table N2) by controlling the extended address bus. For example, it is possible to map the top 16 kbyte block of the ROMCE* device (physical address $FC000–$FFFFF) into the second 16 kbyte block of the microprocessor address range (logical address $4000–$7FFF). This example assumes that a 1 Mbyte (8 Mbit) device is connected to ROMCE*.

TABLE N1

| 16 kbyte block # | Device Address | A19PY | A18PY | A17PY | A16PY | A15PY | A14PY |
|---|---|---|---|---|---|---|---|
| 63 | $FC000–$FFFFF | 1 | 1 | 1 | 1 | 1 | 1 |
| 62 | $F8000–$FBFFF | 1 | 1 | 1 | i | 1 | 0 |
| 61 | $F4000–$F7FFF | 1 | 1 | " | 1 | 0 | 1 |
| " | " | " | " | " | " | " | " |
| " | " | " | " | " | " | " | " |
| 31 | $ | 0 | 1 | 1 | 1 | 1 | 1 |
| " | " | " | " | " | " | " | " |
| " | " | " | " | " | " | " | " |
| 2 | $08000–$0BFFF | 0 | 0 | 0 | 0 | 1 | 0 |
| 1 | $04000–$07FFF | 0 | 0 | 0 | 0 | 0 | 1 |
| 0 | $00000–$03FFF | 0 | 0 | 0 | 0 | 0 | 0 |

TABLE N2

| Logical block # | Microprocessor address range |
|---|---|
| 0 | $0200–$3FFF |
| 1 | $4000–$7FFF |
| 2 | $8000–$BFFF |
| 3 | $C000–$FFFF |

Mapping Registers

The physical device selection and extended address bus selection are controlled by a series of mapping registers located at $0108–$010B. The registers are named MAP'XX' where 'XX' identifies the microprocessor address range controlled. Specifically, MAP03 controls the range $0200–$3FFF, MAP47 controls $4000–$7FFF, MAP8B controls $8000–$BFFF, and MAPCF controls $C000–$FFFF. These eight bit registers allow for one of four devices (maximum) and one of 64 16kbyte pages (maximum) to be mapped into each range.

A particular device is selected by setting/resetting bits 6 and 7 in the appropriate MAP'XX' register. The correspondence between bits 6/7 and the device selection pins are as follows:

| Bit 7 | Bit 6 | Device Selected |
|-------|-------|-----------------|
| 0 | 0 | ROMEN__ |
| 0 | 1 | RAMEN__ |
| 1 | 0 | XROMEN__ |
| 1 | 1 | XRAMEN__ |

Notice that bit 6 selects between ROM or RAM type devices while bit 7 selects primary or auxilliary devices. A minimally configured system is expected to be one with two memory devices selected via the ROMEN__ and RAMEN__ control lines.

Page selection is controlled by the remaining 6 bits in the MAP'XX' registers. Each of these bits controls a particular extended address bus line of the form A'XX'PY according to:

Bit 0=>A14PY, Bit 1=>A15PY, Bit 2=>A16PY,

Bit 3=>A17PY, Bit 4=>A18PY, Bit 5=>A19PY

Protection Registers

The MPP ASIC provides extensive memory write protection in several layers. Both the logical and physical address ranges as well as the mapping registers have protection registers assigned. In addition, the protection registers have password registers assigned to help prevent crashed programs from modifying important data.

The logical address space is write protected in 4kB blocks via the ADD__WP__HI (address $0101) and the ADD__WP__LO (address $0100) registers. A '1' in any bit location will write protect that specific block of microprocessor address space. Multiple blocks are protected by writing '1' in multiple bit locations in these protection registers. Table N3 demonstrates how individual 4 kB blocks are protected.

TABLE N3

Logical address space write protection

| Logical Address | 7 | 6 | 5 | 4 | 3 | 2 | 1 | 0 |
|-----------------|---|---|---|---|---|---|---|---|
| ADD__WP__LO ($0100) | | | | | | | | |
| 0200-0FFF | X | X | X | X | X | X | X | 1 |
| 1000-1FFF | X | X | X | X | X | X | 1 | X |
| 2000-2FFF | X | X | X | X | X | 1 | X | X |
| 3000-3FFF | X | X | X | X | 1 | X | X | X |
| 4000-4FFF | X | X | X | 1 | X | X | X | X |
| 5000-5FFF | X | X | 1 | X | X | X | X | X |
| 6000-6FFF | X | 1 | X | X | X | X | X | X |
| 7000-7FFF | 1 | X | X | X | X | X | X | X |
| ADD__WP__HI ($0101) | | | | | | | | |
| 8000-8FFF | X | X | X | X | X | X | X | 1 |
| 9000-9FFF | X | X | X | X | X | X | 1 | X |
| A000-AFFF | X | X | X | X | X | 1 | X | X |
| B000-BFFF | X | X | X | X | 1 | X | X | X |
| C000-CFFF | X | X | X | 1 | X | X | X | X |
| D000-DFFF | X | X | 1 | X | X | X | X | X |
| E000-EFFF | X | 1 | X | X | X | X | X | X |
| F000-FFFF | 1 | X | X | X | X | X | X | X |

The contents of these two registers is protected by the WP__PASS (address $0020) register. Before the ADD__WP__'XX' registers can be modified, the utility program must first load the value $55 into the WP__PASS register.

The idea here is that a well behaved program will write the password register then modify the write protection registers and then reset the password register. This process will guard against spurious writes to the protection registers.

A second form of write protection in the logical address space is provided by the ROM__MAP (address $0104) and the RAM__MAP (address $0103) registers. With this type of protection the logical address space is divided into 16kB blocks and qualified as being either ROM or RAM. Note that the distinction between ROM and RAM is made by the chip select signals output from the ASIC (ROMEN__ & XROMEN__ =ROM, RAMEN__ & XRAMEN__ =RAM).

Example Mapping Sequence

Because of the complex protection mechanisms built into the MPP ASIC memory circuitry, it is necessary to follow a certain sequence of steps to remap physical memory into logical pages. An example sequence is given below to change logical block #1 to map to the RAMEN__ device block #5 and then allow writing to that physical block and microprocessor range $4000–$4FFF (4 kB section of logical block #1 ).

1) First write the correct password into the DVMPASS register. Store the value $55 into memory location $0102.

2) Next, set up physical block #5 of the RAM device for writing with the RAM__MAP register. Reset bit 5 and set bit 1 of location $0103. This sequence disables write protection and allows modifications to the extended address bus bits in the MAP47 register.

3) Lock the RAM__MAP register by resetting the password in the DVMPASS register.

4) Write the correct password into the DVPASS register. Store the value $55 to memory location $0105. This will allow the DEVLOCK register to be modified.

5) Unlock the MAP47 register by writing the proper value to DEVLOCK. Set bit 4 in memory location $0106. This will allow the MAP47 register to be updated.

6) Select the physical device and 16kB physical bank to map into logical block #1 using the MAP47 register. Store the value $15 into memory location $0109.

7) Lock the MAP47 register by resetting all bits in the DEVLOCK register.

8) Lock the DEVLOCK register by resetting the password in the DVPASS register.

9) Write the correct password into the WP__PASS register. Store the value $AA to memory location $0020.

10) Set up the 4 kB section of logical block #1 for writing with the ADD__WP__LO and ADD__WP__HI registers. Reset bit 5 in address $0100.

11) Lock the ADD__WP__LO and ADD__WP__HI registers by resetting the password in the WP__PASS register.

At this point, physical block #5 of the RAMEN__ device is mapped into the microprocessor to address range $4000–$7FFF and writing is allowed in microprocessor address $4000–$4FFF.

g) Low Battery Detection

A low battery detect circuit is provided for the purpose of testing the state of the primary phone battery in a line-powered phone application. The primary battery is used for coin relay control and to bridge short periods of loop current loss. The primary battery can also be used to provide additional power for other modes of operation that require more current than the operating loop can provide. By measuring the state of the battery, the resident phone firmware can better manage the battery resource providing more reliable phone operation and enabling additional features requiring battery power, essentially making the phone battery transparent to the application. The circuit in FIG. 2G works by providing a known load on the primary battery. If the firmware senses that the battery can sustain the test load certain operation is allowed. If the firmware senses that the battery cannot sustain the test load, a battery conditioning routine will be enabled. The firmware can also determine if the battery has been disconnected or if the battery is non-repairable, and can communicate this diagnosed problem to the host system.

Approximately a 50 mA load is applied under microprocessor control (PC3 low) and battery voltage is measured. The battery pack is expected to provide greater than 4.65V when delivering the 50 mA to the load. If the battery capacity is sufficient, the output of the comparator (PC2) will be a logic high level. This circuit is composed of transistors Q15, Q16, ½ of comparator U12, U15, capacitor C54, zener CR22, and resistors R87–R90, R92, R95, R99.

Circuit operation is as follows: The microprocessor turns on transistor Q16 by bringing port PC3 low. Turning on Q16 results in transistor Q15 turning on. The purpose of Q16 is to level shift the microprocessor output signal, as the microprocessor is not referenced to the minus side of the battery to be measured. Turning Q15 on places a load of approximately 50 mA across the NiCad battery. Note that the actual load placed on the battery will vary slightly due to loop length because of the amount of current that can flow through the battery charging circuitry in regulator hybrid RP4. U15 is a 4.5V voltage detector. The output of U15 will be high (at the +5V rail) if the battery voltage is greater than approximately 4.65V, and low (at +5V—battery voltage). Comparator U12 performs a level shift back to a microprocessor referenced ground potential allowing the microprocessor to read the comparator output. If the comparator output is high, the battery was greater than 4.65V with the 50 mA load applied. And, if the comparator output is low, the battery voltage was less than 4.65V with the 50 mA load applied. The 4.5V voltage detector represents approximately 4.65 volts considering the voltage drop across Q15 when the 50 mA current is passing through it. Also, the comparator input reference is intentionally high at 470k/590k (or 0.7966 Vcc), since the voltage detector between the battery voltage and the regulated 5V (or Vcc) supply voltage. If the battery voltage is very low, the difference would be small, therefore the comparator reference needs to be on the high side to detect this small difference as a low battery condition. For example, if the battery were 2.5V, the detector output would be Vcc-2.5V. The comparator reference must be greater than this value to detect it as a low condition.

It is expected that this circuit not be utilized on every call and only during times when loop current is present. Due to the potential problem of corrupting the operating system during downloads of operating system software or other times when more power is consumed than is available from the local loop or the system battery, it is imperative that this circuit, or some other method, be used to monitor battery quality before this type of operation occurs.

Alternate Method

Figure 27:
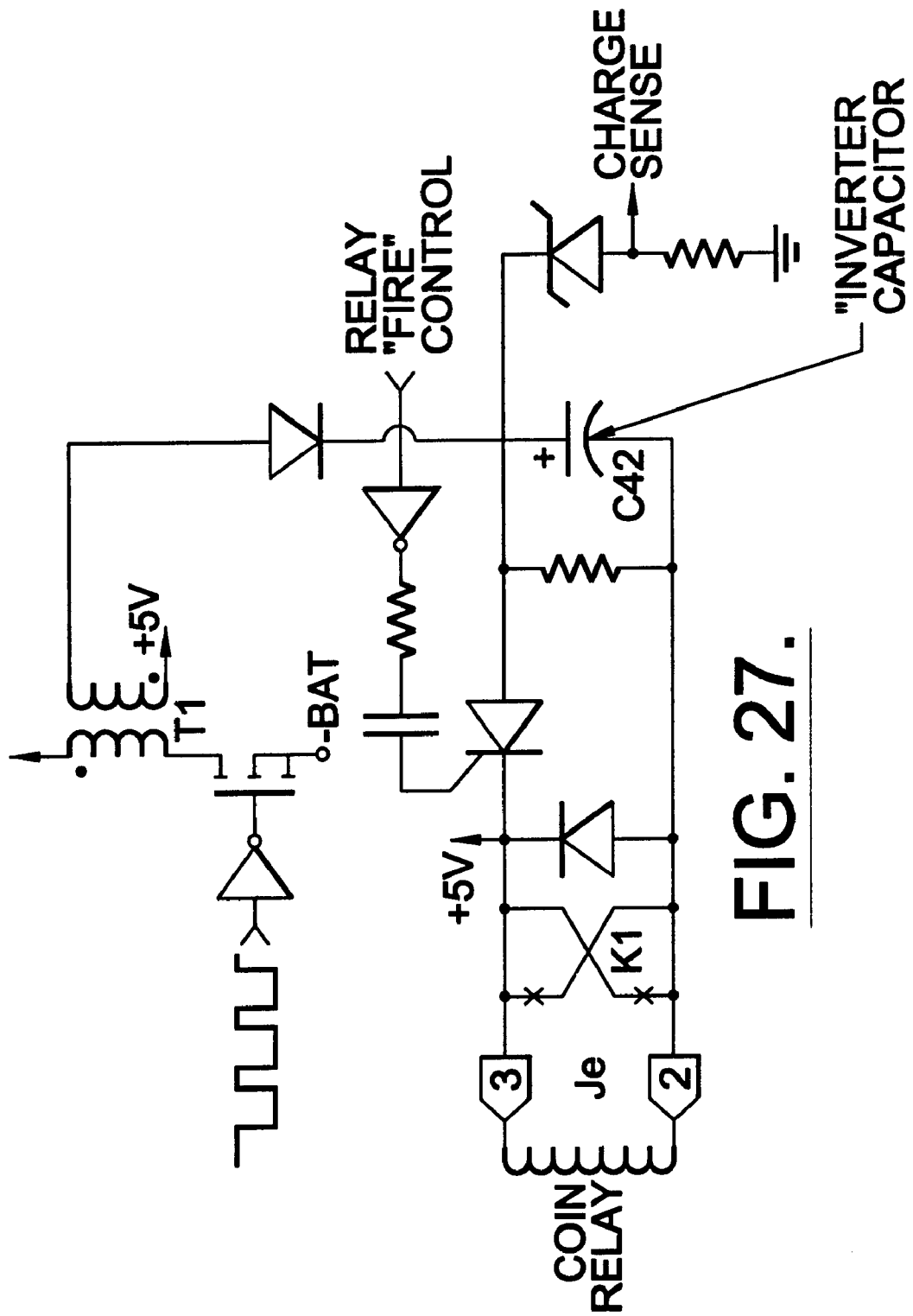
FIG. 27 is a schematic diagram of an inverter control circuit of the present invention.

The firmware will monitor the amount of time required to successfully charge the escrow firing capacitor, as illustrated in FIG. 27, and based upon this time, should be able to estimate the general status of the battery. The following information is provided as a guide to understanding the intended operation of the escrow firing routines and their respective timings.

Figure 25:
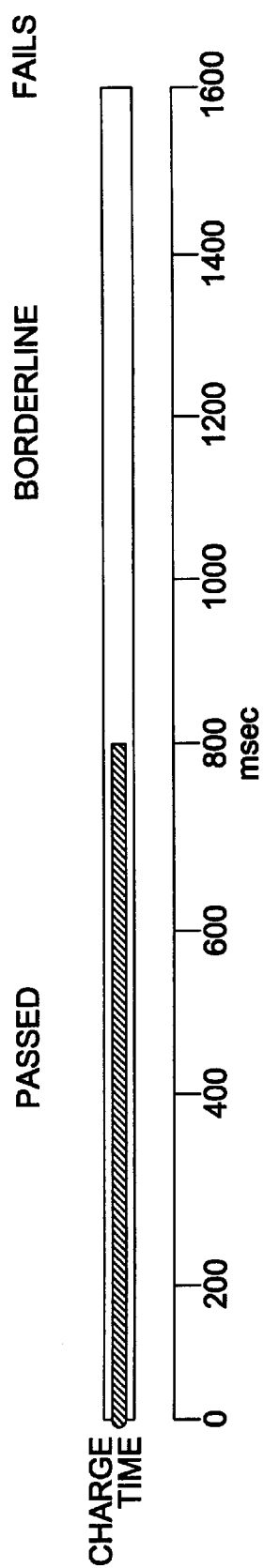
FIG. 25 is an illustration of a charge time monitor display.

The pay phone will attempt to charge the escrow firing capacitor within 1.6 seconds, keeping in mind that any charge that takes longer than 800 ms seconds may be an indication of a relatively low battery, as illustrated with reference to FIG. 25. If the time required to charge the capacitor is longer than 800 ms seconds (but less than 1.6 seconds), the phone will set the low battery status indicator but will still attempt to fire the relay. If the required charge time is greater than 1.6 seconds, the phone will set the low battery status indicator, but will NOT attempt to fire the relay.

The pay phone will no longer enter the battery charge routine as a result of the user taking the phone off the hook. Instead, the firmware will now enter the battery charge routine during the on hook clean-up process of the same call in which the capacitor charge time exceeded expectations, as illustrated with reference to FIG. 27. This change, as well as some of the subsequent changes, will allow emergency 911 calls to be made without interruptions due to the phone entering the battery charge routine on the next off-hook condition.

The user now has complete priority over the battery charge routine. Anytime, during the battery charge routine, the phone detects that the handset has been removed from the cradle, the phone will abort the battery charge routine in process, will provide dial tone to the user and will consider this battery charge attempt completed. The only time that the battery charge routine will not be interrupted, is when it is manually entered by way of the *#68 command.

The phone will also know when the battery charge routine has been entered two times in a row, and will then set the "Low Battery" (LB) reporting flag to indicate to the management system that this situation has occurred. After successfully communicating with the management system, the phone will reset the "LB" reporting flag and low battery status counter.

| Useful Memory Location Information | | |
|---|---|---|
| Memory Location | Bit Assignments | Description |
| OFF7 | Bit-1 | At least one charge attempt made |
| | Bit-0 | Low battery status indicator flag |

If the phone detects that the user dials *#67, the phone will attempt to charge the escrow firing capacitor (per the specifications defined earlier) in order to determine the status of the battery. After completing the charge attempt, the phone will signal to the user the status of the battery as follows:

| Signal | Status | Recommendation |
|---|---|---|
| One beep | Passed | Nothing |
| Two beeps* | Borderline passed | Charge the battery (*#68) |
| Three beeps* | Failed | Charge or replace the battery |

*Note: the phone will automatically enter charge routine after *#67

If the phone detects that the user dials *#68, the phone will immediately enter the battery charge mode and remain there until approximately three minutes of charge time has elapsed. Note: for this specific command, this battery charging session will not be interrupted by the "user priority" feature. Also, the modified battery charge routine will only announce "please wait one moment" when entry into the charge routine was due to a manual request via the *#68 command.

The phone will also enter the battery charge routine as a result of an escrow firing failure while int he special diagnostic mode. If the user enters the diagnostic mode (by pressing 902 while in the program mode), and any escrow related function fails due to a possible low battery, the phone will set the low battery status indicator. When the user goes back on hook, the phone will enter the battery charge routine as part of its normal on hook clean-up process. User priority will be in place for the remainder of the charging session.

As illustrated with reference again to FIG. 26, and by way of example, the phone will always power up every midnight to enter a daily battery charge routine. The phone will add the last two digits of its ANI to the 12:00 AM wake-up time when programming the ASIC to power-up. The battery charging time will be approximately 6 minutes, and customer priority will be in force.

h) Pin Fraud Prevention

Pin fraud is perpetrated by shorting handset interface signals to earth ground during central office coin checks or coin collections. This provides a low impedance path between TIP and earth ground which is precisely the signaling indication the CO is looking for. The prevention circuitry works by limiting the amount of current that can flow through the handset interface leads. This current limit is set up so that the carbon transmitter has sufficient bias current to operate but the CO should not detect a coin ground presence.

Figure 2F:
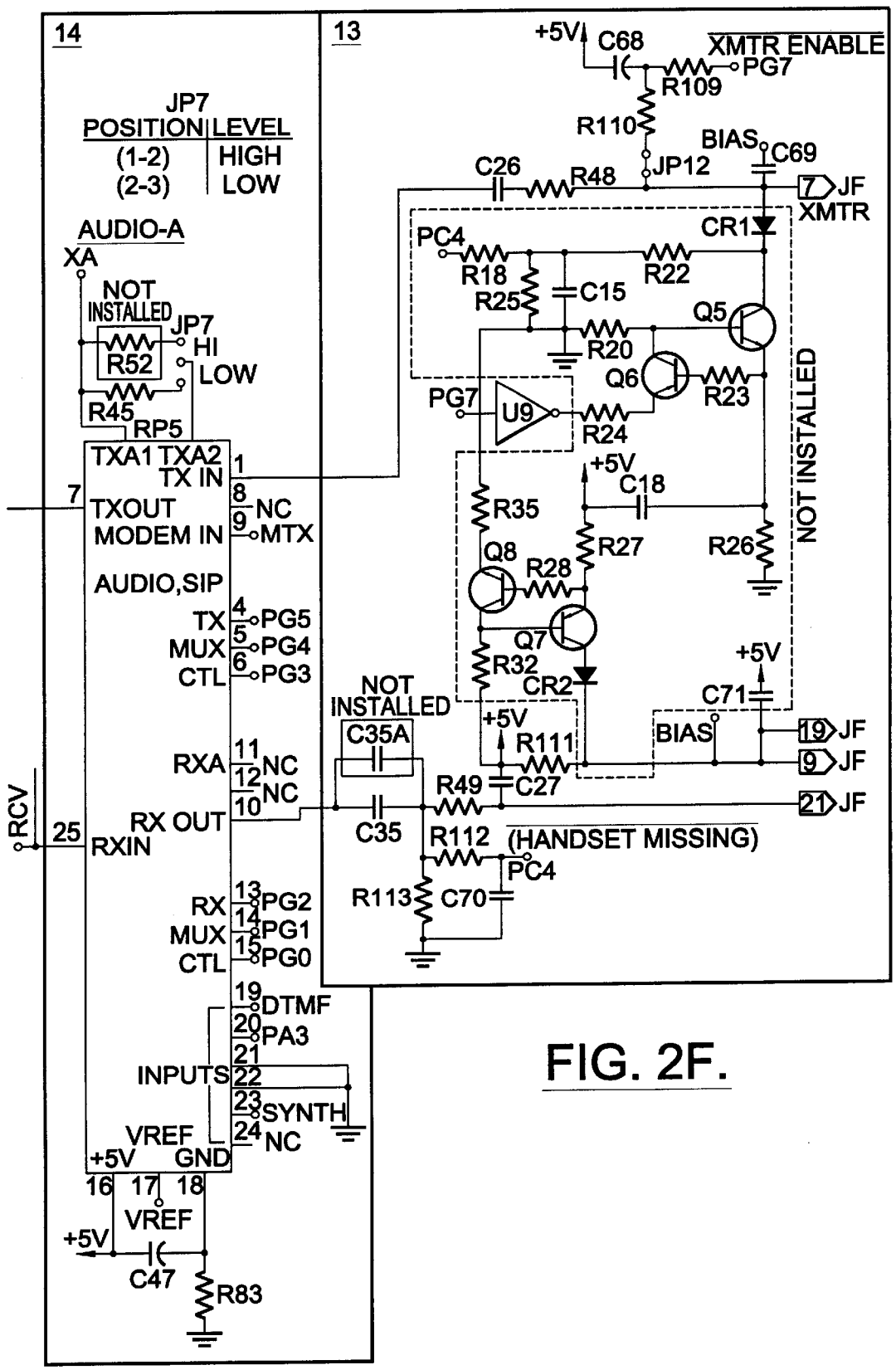
Figure 2G:
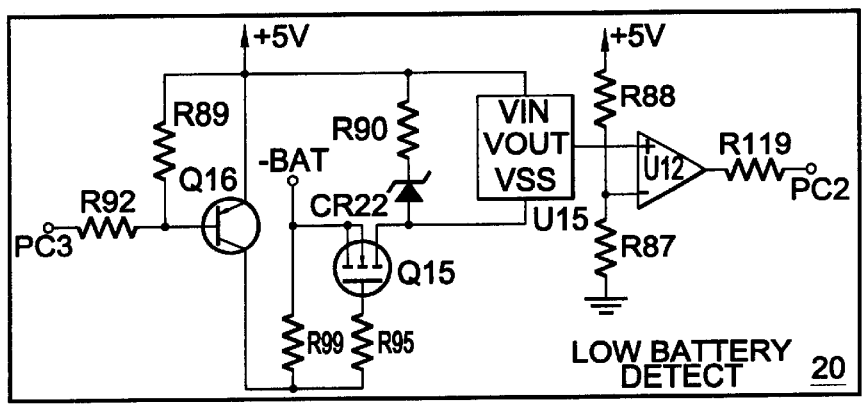
Figure 2H:
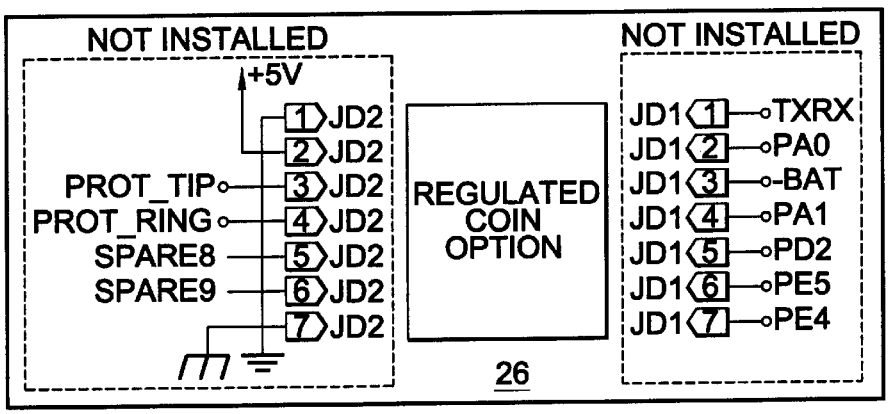
Figure 2I:
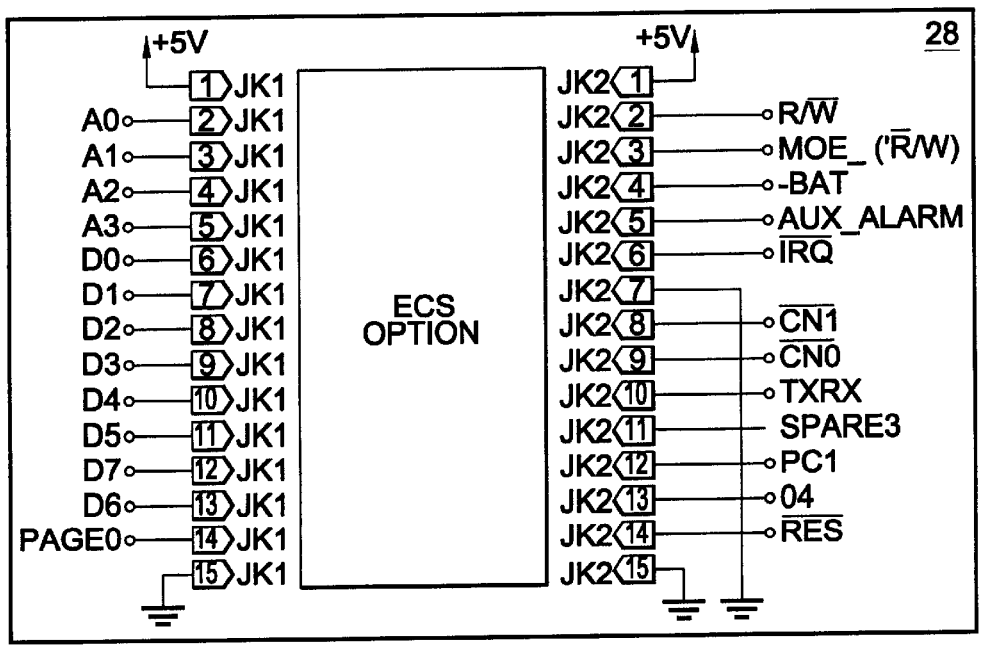
Figure 3:
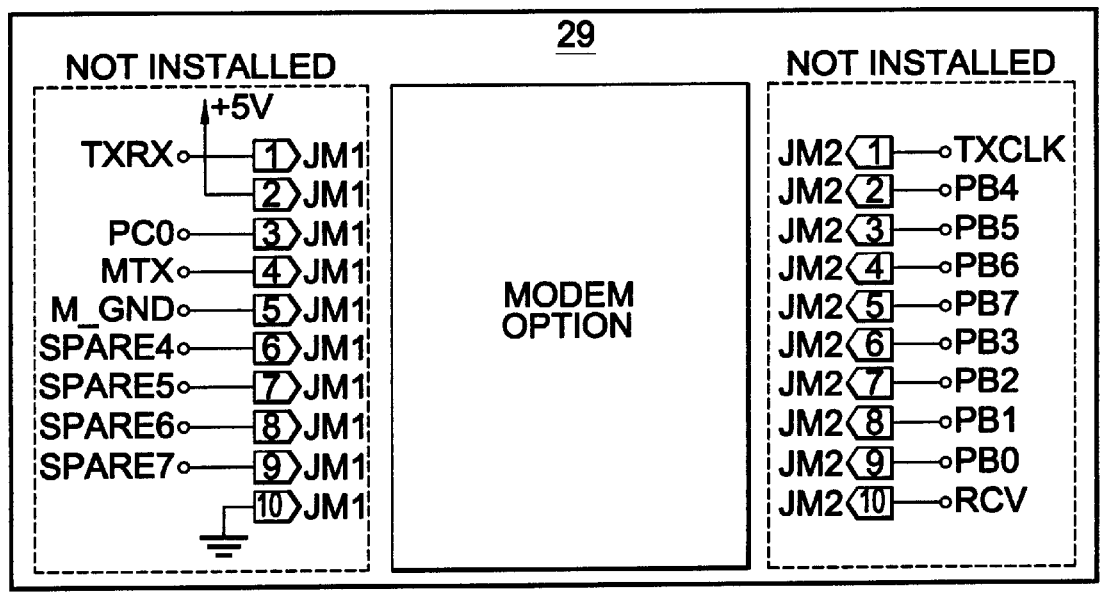
FIG. 3 illustrates a modem option for the embodiment of FIGS. 2A–2I.

With reference again to FIG. 1, handset interface 13, and the circuit diagram of FIG. 2F, two 3 mA current limiters are used to limit the current from both rails. The plus side current limiter is formed by transistors Q7, Q8, diode CR2, and resistors R27, R28, R32, and R35. All current to the handset flows through R27, Q7, and CR2. Below ~3 mA the voltage across R27 keeps Q8 biased on therefore biasing Q7 on as well. Around 3 mA Q8 will begin to stop conducting and will thus throttle back Q7. The negative side is composed of transistors Q5, Q6, diode CR1, and resistors R20, R23, R24, and R26. Operation is similar to the plus side so it will not be repeated here. Due to the potentials used by the CO in coin signaling, several components require higher voltage characteristics. Capacitor C35 is increased in this design to a 100V non-polar. Transistors Q5 and Q7 are chosen for their high voltage Vce capabilities. Diodes CR1 and CR2 are required to block the reverse voltage (-Vce) during CO coin operations.

Components R18, R22, R25, and C15 are used to detect the presence of the handset in a similar manner to other products. The main difference is that because of the two current limiters, it cannot be predetermined what the voltage will be at PC4 with the transmitter enabled (PG7 low). Therefore it is required that the handset missing function be called before enabling the transmitter. Also, PC4 should be written with a "0" to minimize current drain when the transmitter is enabled.

While specific embodiments of the invention have been described in detail herein above, it is to be understood that various modifications may be made from the specific details described herein without departing from the spirit and scope of the invention as set forth in the appended claims.

Having now described the invention, the construction, the operation and use of preferred embodiments thereof, and the advantageous new and useful results obtained thereby, the new and useful constructions methods of use and reasonable mechanical equivalents thereof obvious to those skilled in the art, are set forth in the appended claims.

That which is claimed is:

1. An intelligent public telephone comprising:

an operating system including an application specific integrated circuit operable with a microprocessor;

a delta-sigma modulator circuit integrated into the application specific integrated circuit for simplifying audio functionality thereby improving product reliability;

a high-speed, bi-directional, one-wire master controller integrated into the application specific integrated circuit for facilitating serial communication with a telephone operating device selected from the group consisting of a resident electronic serial number device, custom integrated circuits operable therewith, product option cards, and a multi-functional product interconnect port;

a low power, low impedance hookswitch control circuit integrated into the application specific integrated circuit for improving the affects of intruding water that can cause a false hookswitch indication;

a programmable coin debounce and detection circuit integrated into the application specific integrated circuit;

secured memory page-swapping means for a 64 kbyte direct address system integrated into the application specific integrated circuit;

battery diagnostic means operable with a battery of the operating system, the battery diagnostic means communicating with the microprocessor for providing a signal thereto indicative of battery capacity while maintaining the battery transparent to operation of the telephone;

pin fraud prevention circuitry communicating with the microprocessor and handset for permitting operation of the public telephone upon an enabling signal therefrom to improve product robustness for minimizing potential fraud; and firmware security means for providing firmware security and configuration control of the operating system, and for facilitating flexibility in managing the configuration control.

2. The telephone as recited in claim 1, wherein the firmware security means comprises storing means for storing a configuration code, a product code, and a revision level indicator in the operating system, wherein recognition of the configuration and product codes permits use of firmware with the operating system when a revision level number of the firmware favorably compares with the revision level of the operating system, and the configuration and product codes carried by the firmware favorably compare with the configuration and product codes of the operating system.

3. The telephone as recited in claim 1, further comprising:

a programmable data storage device for modifying the operating system, the storage device having a configuration code carried therein, wherein the data storage device communicates with the operating system of the pay telephone via an input port for upgrading and revising a telephone control operation only when the configuration code recognizable by the firmware security means for permitting revisions to the operating system configuration provides a favorable comparison between the configuration code of the storage device and a configuration code of the operating system.

4. The telephone as recited in claim 1, wherein the operating system comprises a motherboard and an electronic product code stored within the motherboard.

5. The telephone as recited in claim 1, wherein the battery diagnostic means comprises:
voltage detection circuit for measuring a voltage level of the battery when operating with a known load thereacross, the voltage detection circuit providing a level detection signal to the microprocessor; and
battery charging circuit operable with the battery for charging thereof, the charging of the battery initiated by the microprocessor communicating with the battery charging circuit in response to the level detection signal.

6. The telephone as recited in claim 5, wherein the microprocessor provides a battery charging time period based on the level detection signal, and wherein the operating system provides an output signal indicative of a low battery status.

7. The telephone as recited in claim 5, wherein the microprocessor provides a battery voltage level based on the level detection signal, and wherein the operating system provides an output signal indicative of a low battery status.

8. The telephone as recited in claim 1, wherein the pin fraud prevention circuitry comprises current limiting means for limiting an amount of current flowing through the handset and for providing sufficient operating current while preventing detection by a central office communicating with the public telephone.

9. The telephone as recited in claim 8, wherein the current limiting means comprise:
first current limiting means operable with a positive voltage signal from the handset;
second current limiting means operable with a negative voltage signal from the handset; and
signaling means responsive to the positive and negative voltage signals for providing an handset condition signal to the microprocessor indicative of a handset operable condition.

10. The telephone as recited in claim 1, wherein the one-wire master controller comprises:
a serial interface circuit;
a single wire serial bus operable between the serial interface circuit and the application specific integrated circuit;
processing control software operable with the microprocessor for providing signal timing and protocol for controlling operation of the application specific integrated circuit with the telephone operating device.

11. The telephone according to claim 1, wherein the hookswitch control circuit comprises:
a low impedance input circuit connected to contacts of the hookswitch and the application specific integrated circuit; and
a single flip flop and output buffer circuit integrated into the application specific integrated circuit, the flip flop and output buffer circuit operable with the low impedance input circuit for detecting an off-hook condition and an on-hook condition.

12. An intelligent public telephone comprising:
an operating system including an application specific integrated circuit operable with a microprocessor;
a master controller integrated into the application specific integrated circuit and communicating with a telephone operating device through a single wire connection for facilitating serial communication with a telephone operating device selected from the group consisting of an electronic serial number device and custom integrated circuits operable therewith;
a low power, low impedance hookswitch control circuit integrated into the application specific integrated circuit for improving the affects of intruding water that can cause a false hookswitch indication;
battery diagnostic means operable with a battery of the operating system, the battery diagnostic means communicating with the microprocessor for providing a signal thereto indicative of battery capacity;
pin fraud prevention circuitry communicating with the microprocessor and handset for permitting operation of the public telephone upon an enabling signal therefrom to improve product robustness for minimizing potential fraud; and
firmware security means for providing firmware security and configuration control of the operating system, and for facilitating flexibility in managing the configuration control.

13. The telephone as recited in claim 12, wherein the firmware security means comprises storing means for storing a configuration code, a product code, and a revision level indicator in the operating system, wherein recognition of the configuration and product codes permits use of firmware with the operating system when a revision level number of the firmware favorably compares with the revision level of the operating system, and the configuration and product codes carried by the firmware favorably compare with the configuration and product codes of the operating system.

14. The telephone as recited in claim 12, further comprising:
a programmable data storage device for modifying the operating system, the storage device having a configuration code carried therein, wherein the data storage device communicates with the operating system of the pay telephone via an input port for upgrading and revising a telephone control operation only when the configuration code recognizable by the firmware security means for permitting revisions to the operating system configuration provides a favorable comparison between the configuration code of the storage device and a configuration code of the operating system.

15. The telephone as recited in claim 12, wherein the operating system comprises a motherboard and an electronic product code stored within the motherboard.

16. The telephone as recited in claim 12, wherein the battery diagnostic means comprises:
voltage detection circuit for measuring a voltage level of the battery when operating with a known load thereacross, the voltage detection circuit providing a level detection signal to the microprocessor; and
battery charging circuit operable with the battery for charging thereof, the charging of the battery initiated by the microprocessor communicating with the battery charging circuit in response to the level detection signal.

17. The telephone as recited in claim 16, wherein the microprocessor provides a battery charging time period based on the level detection signal, and wherein the operating system provides an output signal indicative of a low battery status.

18. The telephone as recited in claim 16, wherein the microprocessor provides a battery voltage level based on the level detection signal, and wherein the operating system provides an output signal indicative of a low battery status.

19. The telephone as recited in claim 12, wherein the pin fraud prevention circuitry comprises current limiting means for limiting an amount of current flowing through the handset and for providing sufficient operating current while preventing detection by a central office communicating with the public telephone.

20. The telephone as recited in claim 19, wherein the current limiting means comprise:

first current limiting means operable with a positive voltage signal from the handset;

second current limiting means operable with a negative voltage signal from the handset; and signaling means responsive to the positive and negative voltage signals for providing an handset condition signal to the microprocessor indicative of a handset operable condition.

21. The telephone as recited in claim 12, wherein the one-wire master controller comprises:

a serial interface circuit;

a single wire serial bus operable between the serial interface circuit and the application specific integrated circuit;

processing control software operable with the microprocessor for providing signal timing and protocol for controlling operation of the application specific integrated circuit with the telephone operating device.

22. The telephone according to claim 12, wherein the hookswitch control circuit comprises:

a low impedance input circuit connected to contacts of the hookswitch and the application specific integrated circuit; and a single flip flop and output buffer circuit integrated into the application specific integrated circuit, the flip flop and output buffer circuit operable with the low impedance input circuit for detecting an off-hook condition and an on-hook condition.

* * * * *